(12) United States Patent
Sollie et al.

(10) Patent No.: US 11,027,908 B2
(45) Date of Patent: Jun. 8, 2021

(54) LINER

(71) Applicant: Pratt Corrugated Holdings, Inc., Conyers, GA (US)

(72) Inventors: Greg Sollie, Sharpsburg, GA (US); Jamie Waltermire, Peachtree City, GA (US); Shifeng Chen, Newport News, VA (US)

(73) Assignee: Pratt Corrugated Holdings, Inc., Conyers, GA (US)

( * ) Notice: Subject to any disclaimer, the term of this patent is extended or adjusted under 35 U.S.C. 154(b) by 0 days.

(21) Appl. No.: 15/988,550

(22) Filed: May 24, 2018

(65) Prior Publication Data

US 2019/0359412 A1 Nov. 28, 2019

(51) Int. Cl.
| | |
|---|---|
| *B65D 81/38* | (2006.01) |
| *B31B 50/74* | (2017.01) |
| *B65D 5/60* | (2006.01) |
| *B31B 120/40* | (2017.01) |

(52) U.S. Cl.
CPC .......... *B65D 81/3858* (2013.01); *B31B 50/74* (2017.08); *B65D 5/60* (2013.01); *B31B 2120/402* (2017.08)

(58) Field of Classification Search
CPC ............ B65D 81/3858; B65D 81/3897; B65D 5/58–603; B65D 88/1618; B65D 5/606; B65D 31/005; B65D 90/46; B65D 31/06; B65D 33/02; B31B 2120/402; B31B 2120/407
USPC ............... 229/103.11, 117.27, 117.35, 117.3, 229/117.01, 122.32; 383/109–110, 107, 383/122, 121, 121.1, 104, 119
See application file for complete search history.

(56) References Cited

U.S. PATENT DOCUMENTS

| | | | |
|---|---|---|---|
| 265,985 | A | 10/1882 | Seabury |
| 1,527,167 | A | 2/1925 | Birdseye |
| 1,677,565 | A | 7/1928 | Oppenheim |
| 1,682,410 | A | 8/1928 | Oppenheim |
| 1,747,980 | A | 2/1930 | Kondolf |
| 1,753,813 | A | 4/1930 | Washburn |
| 1,868,996 | A | 7/1932 | Sharp |

(Continued)

FOREIGN PATENT DOCUMENTS

| | | |
|---|---|---|
| CA | 2019104 | 12/1991 |
| CN | 1503962 | 6/2004 |

(Continued)

OTHER PUBLICATIONS

US 10,562,676 B2, 02/2020, Waltermire et al. (withdrawn)

(Continued)

*Primary Examiner* — Nathan J Newhouse
*Assistant Examiner* — Phillip D Schmidt
(74) *Attorney, Agent, or Firm* — Taylor English Duma LLP

(57) ABSTRACT

A liner includes a liner subassembly, the liner subassembly comprising a body portion, the body portion comprising a front, a back, a first side, a second side, and a bottom, the body portion defining a cavity; and a flap portion hingedly connected to a top end of the back, the flap portion sized to cover the cavity; and a support connected to the bottom, the support comprising a central body and two end portions, each end portion hingedly connected to the central body, wherein the body portion and the flap portion comprise insulated walls.

19 Claims, 14 Drawing Sheets

(56) References Cited

U.S. PATENT DOCUMENTS

| | | | |
|---|---|---|---|
| 1,896,393 A | 2/1933 | Devine | |
| 1,899,892 A | 2/1933 | D'Este et al. | |
| 1,930,680 A | 10/1933 | Hinton | |
| 1,935,923 A | 11/1933 | Thoke | |
| 1,937,263 A | 11/1933 | Bubb | |
| 1,942,917 A * | 1/1934 | D Este | B65D 31/04 383/110 |
| 1,954,013 A | 4/1934 | Lilienfield | |
| 2,018,519 A | 10/1935 | Hall | |
| 2,070,747 A | 2/1937 | Ostrom | |
| 2,116,513 A | 5/1938 | Frankenstein | |
| 2,148,454 A | 2/1939 | Gerard | |
| 2,165,327 A | 7/1939 | Zalkind | |
| 2,289,060 A | 7/1942 | Merkle | |
| 2,293,361 A | 8/1942 | Roberts | |
| 2,360,806 A | 10/1944 | Van Rosen | |
| 2,386,905 A | 10/1945 | Meitzen | |
| 2,389,601 A | 11/1945 | De Witt | |
| 2,485,643 A | 10/1949 | Norquist | |
| 2,554,004 A | 5/1951 | Bergstein | |
| 2,632,311 A | 3/1953 | Sullivan | |
| 2,650,016 A * | 8/1953 | McMillan | B65D 33/02 383/10 |
| 2,753,102 A | 7/1956 | Paige | |
| 2,867,035 A | 1/1959 | Patterson, Jr. | |
| 2,899,103 A | 8/1959 | Ebert | |
| 2,927,720 A | 3/1960 | Adams | |
| 2,986,324 A | 5/1961 | Anderson, Jr. | |
| 2,987,239 A | 6/1961 | Atwood | |
| 3,029,008 A | 4/1962 | Membrino | |
| 3,031,121 A | 4/1962 | Chase | |
| 3,065,895 A * | 11/1962 | Lipschutz | B65D 5/60 229/117.31 |
| 3,096,879 A | 7/1963 | Schumacher | |
| 3,097,782 A | 7/1963 | Koropatkin et al. | |
| 3,182,913 A | 5/1965 | Brian | |
| 3,193,176 A | 7/1965 | Gullickson et al. | |
| 3,194,471 A | 7/1965 | Murphy | |
| 3,222,843 A | 12/1965 | Schneider | |
| 3,236,206 A | 2/1966 | Willinger | |
| 3,282,411 A | 11/1966 | Jardine | |
| 3,286,825 A | 11/1966 | Laas | |
| 3,335,941 A | 8/1967 | Gatward | |
| 3,371,462 A | 3/1968 | Nordkvist et al. | |
| 3,375,934 A | 4/1968 | Bates | |
| 3,399,818 A | 9/1968 | Stegner | |
| 3,420,363 A | 1/1969 | Blickensderfer | |
| 3,435,736 A | 4/1969 | Reiche | |
| 3,465,948 A | 9/1969 | Boyer | |
| 3,503,550 A | 3/1970 | Main et al. | |
| 3,551,945 A | 1/1971 | Eyberg et al. | |
| 3,670,948 A | 6/1972 | Berg | |
| 3,703,383 A | 11/1972 | Kuchenbecker | |
| 3,734,336 A | 5/1973 | Rankow et al. | |
| 3,747,743 A | 7/1973 | Hoffman, Jr. | |
| 3,749,299 A | 7/1973 | Ingle | |
| 3,836,044 A | 9/1974 | Tilp et al. | |
| 3,843,038 A | 10/1974 | Sax | |
| 3,880,341 A | 4/1975 | Bamburg et al. | |
| 3,887,743 A | 6/1975 | Lane | |
| 3,890,762 A | 6/1975 | Ernst et al. | |
| 3,980,005 A | 9/1976 | Buonaiuto | |
| 4,030,227 A | 6/1977 | Oftedahl | |
| 4,050,264 A | 9/1977 | Tanaka | |
| 4,068,779 A | 1/1978 | Canfield | |
| 4,091,852 A | 5/1978 | Jordan et al. | |
| 4,169,540 A | 10/1979 | Larsson et al. | |
| 4,211,267 A * | 7/1980 | Skovgaard | B65D 33/00 229/69 |
| 4,213,310 A | 7/1980 | Buss | |
| 4,335,844 A | 6/1982 | Egli | |
| 4,342,416 A | 8/1982 | Philips | |
| 4,380,314 A | 4/1983 | Langston, Jr. et al. | |
| 4,396,144 A | 8/1983 | Gutierrez et al. | |
| 4,418,864 A | 12/1983 | Neilsen | |
| 4,488,623 A | 12/1984 | Linnell, II et al. | |
| 4,509,645 A | 4/1985 | Hotta | |
| 4,679,242 A | 7/1987 | Brockhaus | |
| 4,682,708 A | 7/1987 | Pool | |
| 4,797,010 A | 1/1989 | Coelho | |
| 4,819,793 A | 4/1989 | Willard et al. | |
| 4,828,133 A | 5/1989 | Hougendobler | |
| 4,830,282 A | 5/1989 | Knight, Jr. | |
| 4,889,252 A | 12/1989 | Rockom et al. | |
| 4,930,903 A | 6/1990 | Mahoney | |
| 4,989,780 A | 2/1991 | Foote et al. | |
| 5,016,813 A | 5/1991 | Simons | |
| 5,020,481 A | 6/1991 | Nelson | |
| 5,062,527 A | 11/1991 | Westerman | |
| 5,094,547 A | 3/1992 | Graham | |
| 5,102,004 A | 4/1992 | Hollander et al. | |
| 5,154,309 A | 10/1992 | Wischusen, III et al. | |
| 5,158,371 A | 10/1992 | Moravek | |
| 5,165,583 A | 11/1992 | Kouwenberg | |
| 5,185,904 A | 2/1993 | Rogers et al. | |
| 5,226,542 A | 7/1993 | Boecker et al. | |
| 5,230,450 A | 7/1993 | Mahvi et al. | |
| 5,263,339 A | 11/1993 | Evans | |
| 5,358,757 A | 10/1994 | Robinette et al. | |
| 5,372,429 A * | 12/1994 | Beaver, Jr. | B65D 33/2508 206/524.3 |
| 5,417,342 A | 5/1995 | Hutchison | |
| 5,418,031 A | 5/1995 | English | |
| 5,441,170 A | 8/1995 | Bane, III | |
| 5,454,471 A | 10/1995 | Norvell | |
| 5,491,186 A | 2/1996 | Kean et al. | |
| 5,493,874 A | 2/1996 | Landgrebe | |
| 5,499,473 A | 3/1996 | Ramberg | |
| 5,505,810 A | 4/1996 | Kirby et al. | |
| 5,511,667 A | 4/1996 | Carder | |
| 5,512,345 A | 4/1996 | Tsutsumi et al. | |
| 5,516,580 A | 5/1996 | Frenette et al. | |
| 5,562,228 A | 10/1996 | Ericson | |
| 5,573,119 A | 11/1996 | Luray | |
| 5,596,880 A | 1/1997 | Welker et al. | |
| 5,613,610 A | 3/1997 | Bradford | |
| 5,615,795 A | 4/1997 | Tipps | |
| 5,638,978 A | 6/1997 | Cadiente | |
| 5,775,576 A | 7/1998 | Stone | |
| 5,842,571 A | 12/1998 | Rausch | |
| 5,906,290 A | 5/1999 | Haberkorn | |
| 5,996,366 A | 12/1999 | Renard | |
| 6,003,719 A | 12/1999 | Steward, III | |
| 6,041,958 A | 3/2000 | Tremelo | |
| 6,048,099 A | 4/2000 | Muffett et al. | |
| 6,050,412 A | 4/2000 | Clough et al. | |
| 6,138,902 A | 10/2000 | Welch | |
| 6,164,526 A | 12/2000 | Dalvey | |
| 6,168,040 B1 | 1/2001 | Sautner et al. | |
| 6,220,473 B1 | 4/2001 | Lehman et al. | |
| 6,223,551 B1 | 5/2001 | Mitchell | |
| 6,238,091 B1 | 5/2001 | Mogil | |
| 6,244,458 B1 | 6/2001 | Frysinger et al. | |
| 6,247,328 B1 | 6/2001 | Mogil | |
| 6,295,830 B1 | 10/2001 | Newman | |
| 6,295,860 B1 | 10/2001 | Sakairi et al. | |
| 6,308,850 B1 | 10/2001 | Coom et al. | |
| 6,325,281 B1 | 12/2001 | Grogan | |
| 6,443,309 B1 | 9/2002 | Becker | |
| 6,453,682 B1 | 9/2002 | Jennings et al. | |
| 6,478,268 B1 | 11/2002 | Bidwell et al. | |
| 6,510,705 B1 | 1/2003 | Jackson | |
| 6,582,124 B2 | 6/2003 | Mogil | |
| 6,618,868 B2 | 9/2003 | Minnick | |
| 6,688,133 B1 | 2/2004 | Donefrio | |
| 6,725,783 B2 | 4/2004 | Sekino | |
| 6,726,017 B2 | 4/2004 | Maresh et al. | |
| 6,736,309 B1 | 5/2004 | Westerman et al. | |
| 6,771,183 B2 | 8/2004 | Hunter | |
| 6,821,019 B2 | 11/2004 | Mogil | |
| 6,837,420 B2 | 1/2005 | Westerman et al. | |
| 6,868,982 B2 | 3/2005 | Gordon | |
| 6,875,486 B2 | 4/2005 | Miller | |
| 6,899,229 B2 | 5/2005 | Dennison et al. | |

(56) References Cited

U.S. PATENT DOCUMENTS

| | | |
|---|---|---|
| 6,910,582 B2 | 6/2005 | Lantz |
| 6,913,389 B2 | 7/2005 | Kannankeril et al. |
| 6,971,539 B1 | 12/2005 | Abbe |
| 7,000,962 B2 | 2/2006 | Le |
| 7,019,271 B2 | 3/2006 | Wnek et al. |
| 7,070,841 B2 | 7/2006 | Benim et al. |
| 7,094,192 B2 | 8/2006 | Schoenberger et al. |
| 7,140,773 B2 | 11/2006 | Becker et al. |
| 7,225,632 B2 | 6/2007 | Derifield |
| 7,225,970 B2 | 6/2007 | Philips |
| 7,229,677 B2 | 6/2007 | Miller |
| 7,264,147 B1 | 9/2007 | Benson et al. |
| 7,392,931 B2 | 7/2008 | Issler |
| 7,452,316 B2 | 11/2008 | Cals et al. |
| D582,676 S | 12/2008 | Rothschild |
| 7,597,209 B2 | 10/2009 | Rothschild et al. |
| 7,607,563 B2 | 10/2009 | Hanna et al. |
| 7,677,406 B2 | 3/2010 | Maxson |
| 7,681,405 B2 | 3/2010 | Williams |
| 7,784,301 B2 | 8/2010 | Sasaki et al. |
| 7,807,773 B2 | 10/2010 | Matsuoka et al. |
| 7,841,512 B2 | 11/2010 | Westerman |
| 7,845,508 B2 | 12/2010 | Rothschild et al. |
| 7,870,992 B2 | 1/2011 | Schille et al. |
| 7,909,806 B2 | 3/2011 | Goodman et al. |
| 7,971,720 B2 | 7/2011 | Minkler |
| 8,118,177 B2 | 2/2012 | Drapela et al. |
| 8,209,995 B2 | 7/2012 | Kieling et al. |
| 8,210,353 B2 | 7/2012 | Epicureo |
| 8,343,024 B1 | 1/2013 | Contanzo, Jr. et al. |
| 8,365,943 B2 | 2/2013 | Bentley |
| 8,465,404 B2 | 6/2013 | Hadley |
| 8,579,183 B2 | 11/2013 | Belfort et al. |
| 8,596,520 B2 | 12/2013 | Scott |
| 8,613,202 B2 | 12/2013 | Williams |
| 8,651,593 B2 | 2/2014 | Bezich et al. |
| 8,763,811 B2 | 7/2014 | Lantz |
| 8,763,886 B2 | 7/2014 | Hall |
| 8,795,470 B2 | 8/2014 | Henderson et al. |
| 8,919,082 B1 | 12/2014 | Cataldo |
| 8,960,528 B2 | 2/2015 | Sadlier |
| 9,272,475 B2 | 3/2016 | Ranade et al. |
| 9,290,313 B2 | 3/2016 | De Lesseux et al. |
| 9,322,136 B2 | 4/2016 | Ostendorf et al. |
| D758,182 S | 6/2016 | Sponselee |
| 9,394,633 B2 | 7/2016 | Shimotsu et al. |
| 9,408,445 B2 | 8/2016 | Mogil et al. |
| 9,429,350 B2 | 8/2016 | Chapman, Jr. |
| 9,499,294 B1 | 11/2016 | Contanzo, Jr. |
| 9,550,618 B1 | 1/2017 | Jobe |
| 9,605,382 B2 | 3/2017 | Virtanen |
| 9,611,067 B2 | 4/2017 | Collison |
| 9,635,916 B2 | 5/2017 | Bezich et al. |
| 9,701,437 B2 | 7/2017 | Bugas et al. |
| 9,738,420 B2 | 8/2017 | Miller |
| 9,738,432 B1 | 8/2017 | Petrucci et al. |
| 9,834,366 B2 | 12/2017 | Giuliani |
| 9,908,680 B2 | 3/2018 | Shi et al. |
| 9,908,684 B2 | 3/2018 | Collison |
| 9,920,517 B2 | 3/2018 | Sollie |
| 9,950,830 B2 | 4/2018 | De Lesseux et al. |
| 9,981,797 B2 | 5/2018 | Aksan et al. |
| 10,046,901 B1 | 8/2018 | Jobe |
| 10,094,126 B2 | 10/2018 | Collison et al. |
| 10,112,756 B2 | 10/2018 | Menzel, Jr. |
| 10,226,909 B2 | 3/2019 | Frem et al. |
| 10,266,332 B2 | 4/2019 | Aksan et al. |
| 10,357,936 B1 | 7/2019 | Vincent et al. |
| 10,442,600 B2 | 10/2019 | Waltermire et al. |
| 10,507,968 B2 | 12/2019 | Sollie et al. |
| 10,551,110 B2 | 2/2020 | Waltermire et al. |
| 10,583,977 B2 | 3/2020 | Collison et al. |
| 10,800,595 B2 | 10/2020 | Waltermire et al. |
| 10,843,840 B2 | 11/2020 | Sollie et al. |
| 10,858,141 B2 | 12/2020 | Sollie et al. |
| 10,882,681 B2 | 1/2021 | Waltermire et al. |
| 10,882,682 B2 | 1/2021 | Collison et al. |
| 10,882,683 B2 | 1/2021 | Collison et al. |
| 10,882,684 B2 | 1/2021 | Sollie et al. |
| 10,926,939 B2 | 2/2021 | Collison et al. |
| 10,941,977 B2 | 3/2021 | Waltermire et al. |
| 10,947,025 B2 | 3/2021 | Sollie et al. |
| 10,954,057 B2 | 3/2021 | Waltermire et al. |
| 10,954,058 B2 | 3/2021 | Sollie et al. |
| 2001/0010312 A1 | 8/2001 | Mogil |
| 2002/0020188 A1 | 2/2002 | Sharon et al. |
| 2002/0064318 A1 | 5/2002 | Malone et al. |
| 2002/0162767 A1* | 11/2002 | Ohtsubo ............ B65D 33/2591 |
| | | 206/524.8 |
| 2003/0145561 A1 | 8/2003 | Cals et al. |
| 2004/0004111 A1 | 1/2004 | Cardinale |
| 2004/0031842 A1 | 2/2004 | Westerman et al. |
| 2004/0079794 A1 | 4/2004 | Mayer |
| 2005/0109655 A1 | 5/2005 | Vershum et al. |
| 2005/0117817 A1 | 6/2005 | Mogil et al. |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2005/0279963 A1 | 12/2005 | Church et al. |
| 2006/0053828 A1 | 3/2006 | Shallman et al. |
| 2006/0078720 A1 | 4/2006 | Toas et al. |
| 2006/0096978 A1* | 5/2006 | Lafferty ............... B65D 5/0209 |
| | | 219/730 |
| 2006/0193541 A1* | 8/2006 | Norcom ................. B65D 31/06 |
| | | 383/200 |
| 2006/0243784 A1 | 11/2006 | Glaser et al. |
| 2007/0000932 A1 | 1/2007 | Cron et al. |
| 2007/0000983 A1 | 1/2007 | Spurrell et al. |
| 2007/0051782 A1 | 3/2007 | Lantz |
| 2007/0193298 A1 | 8/2007 | Derifield |
| 2007/0209307 A1 | 9/2007 | Andersen |
| 2007/0257040 A1 | 11/2007 | Price, Jr. et al. |
| 2008/0095959 A1 | 4/2008 | Warner et al. |
| 2008/0135564 A1 | 6/2008 | Romero |
| 2008/0173703 A1 | 7/2008 | Westerman et al. |
| 2008/0190940 A1 | 8/2008 | Scott |
| 2008/0203090 A1 | 8/2008 | Dickinson |
| 2008/0289302 A1 | 11/2008 | Vulpitta |
| 2008/0296356 A1 | 12/2008 | Hatcher et al. |
| 2008/0308616 A1* | 12/2008 | Phung .................. B65D 75/525 |
| | | 229/117.27 |
| 2008/0314794 A1 | 12/2008 | Bowman |
| 2009/0034883 A1 | 2/2009 | Giuliani |
| 2009/0114311 A1* | 5/2009 | McDowell ............ B65D 5/545 |
| | | 141/316 |
| 2009/0193765 A1 | 8/2009 | Lantz |
| 2009/0214142 A1* | 8/2009 | Bossel ................... B65D 33/02 |
| | | 383/204 |
| 2009/0283578 A1 | 11/2009 | Miller |
| 2009/0288791 A1 | 11/2009 | Hammer et al. |
| 2010/0001056 A1* | 1/2010 | Chandaria ............ B65D 5/3621 |
| | | 229/198.2 |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0139878 A1 | 6/2010 | Clemente |
| 2010/0151164 A1 | 6/2010 | Grant et al. |
| 2010/0258574 A1 | 10/2010 | Bentley |
| 2010/0270317 A1 | 10/2010 | Kieling et al. |
| 2010/0282827 A1 | 11/2010 | Padovani |
| 2010/0284634 A1* | 11/2010 | Hadley ............... B65D 81/3858 |
| | | 383/211 |
| 2010/0314397 A1 | 12/2010 | Williams et al. |
| 2010/0314437 A1 | 12/2010 | Dowd |
| 2011/0042449 A1 | 2/2011 | Copenhaver et al. |
| 2011/0100868 A1 | 5/2011 | Lantz |
| 2011/0114513 A1 | 5/2011 | Miller |
| 2011/0235950 A1 | 9/2011 | Lin |
| 2011/0284556 A1 | 11/2011 | Palmer et al. |
| 2011/0311758 A1 | 12/2011 | Burns et al. |
| 2011/0317944 A1* | 12/2011 | Liu ........................ B65D 33/02 |
| | | 383/119 |
| 2012/0031957 A1 | 2/2012 | Whitaker |

(56) References Cited

U.S. PATENT DOCUMENTS

| | | |
|---|---|---|
| 2012/0074823 A1 | 3/2012 | Bezich et al. |
| 2012/0145568 A1 | 6/2012 | Collison et al. |
| 2012/0243808 A1 | 9/2012 | De Lesseux et al. |
| 2012/0248101 A1 | 10/2012 | Tumber et al. |
| 2012/0251818 A1 | 10/2012 | Axrup et al. |
| 2012/0279896 A1 | 11/2012 | Lantz |
| 2013/0112694 A1 | 5/2013 | Bentley |
| 2013/0112695 A1 | 5/2013 | Hall |
| 2013/0140317 A1 | 6/2013 | Roskoss |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0248003 A1 | 9/2014 | Mogil et al. |
| 2014/0319018 A1 | 10/2014 | Collison |
| 2014/0367393 A1 | 12/2014 | Ranade |
| 2015/0110423 A1* | 4/2015 | Fox .................. B65D 29/04 383/117 |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0259126 A1 | 9/2015 | McGoff et al. |
| 2015/0284131 A1 | 10/2015 | Genender et al. |
| 2015/0345853 A1 | 12/2015 | Oeyen |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0304267 A1 | 10/2016 | Aksan |
| 2016/0325915 A1 | 11/2016 | Aksan |
| 2017/0015080 A1 | 1/2017 | Collison et al. |
| 2017/0043937 A1 | 2/2017 | Lantz |
| 2017/0144792 A1 | 5/2017 | Block |
| 2017/0198959 A1 | 7/2017 | Morris |
| 2017/0225870 A1 | 8/2017 | Collison |
| 2017/0233134 A9 | 8/2017 | Grajales et al. |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0361973 A1 | 12/2017 | Padilla |
| 2017/0369226 A1 | 12/2017 | Chase et al. |
| 2018/0050857 A1 | 2/2018 | Collison |
| 2018/0051460 A1 | 2/2018 | Sollie et al. |
| 2018/0148246 A1 | 5/2018 | Fu et al. |
| 2018/0194534 A1 | 7/2018 | Jobe |
| 2018/0215525 A1 | 8/2018 | Vogel et al. |
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1* | 10/2018 | Waltermire ........ B65D 81/3897 |
| 2018/0299059 A1 | 10/2018 | McGoff et al. |
| 2018/0327171 A1 | 11/2018 | Waltermire et al. |
| 2018/0327172 A1 | 11/2018 | Waltermire et al. |
| 2018/0334308 A1 | 11/2018 | Moore et al. |
| 2018/0335241 A1 | 11/2018 | Li et al. |
| 2019/0032991 A1 | 1/2019 | Waltermire et al. |
| 2019/0047775 A1 | 2/2019 | Waltermire et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0234679 A1 | 8/2019 | Waltermire et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359413 A1 | 11/2019 | Sollie et al. |
| 2019/0359414 A1 | 11/2019 | Sollie et al. |
| 2019/0367209 A1 | 12/2019 | Jobe |
| 2019/0376636 A1 | 12/2019 | Fellinger et al. |
| 2019/0382186 A1 | 12/2019 | Sollie et al. |
| 2019/0390892 A1 | 12/2019 | Waltermire et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0148409 A1 | 5/2020 | Sollie et al. |
| 2020/0148410 A1 | 5/2020 | Sollie et al. |
| 2020/0148453 A1 | 5/2020 | Sollie et al. |
| 2020/0283188 A1 | 9/2020 | Sollie et al. |
| 2020/0346816 A1 | 11/2020 | Sollie et al. |
| 2020/0346841 A1 | 11/2020 | Sollie et al. |
| 2021/0039869 A1 | 2/2021 | Waltermire et al. |
| 2021/0039870 A1 | 2/2021 | Sollie et al. |
| 2021/0039871 A1 | 2/2021 | Sollie et al. |
| 2021/0070527 A1 | 3/2021 | Sollie et al. |
| 2021/0070529 A1 | 3/2021 | Sollie et al. |
| 2021/0070530 A1 | 3/2021 | Sollie et al. |
| 2021/0101734 A1 | 4/2021 | Collison et al. |
| 2021/0101735 A1 | 4/2021 | Collison et al. |
| 2021/0101736 A1 | 4/2021 | Waltermire et al. |
| 2021/0101737 A1 | 4/2021 | Waltermire et al. |
| 2021/0102746 A1 | 4/2021 | Waltermire et al. |

FOREIGN PATENT DOCUMENTS

| | | |
|---|---|---|
| CN | 102264961 | 11/2011 |
| CN | 206494316 | 9/2017 |
| CN | 108001787 | 5/2018 |
| DE | 1897846 | 7/1964 |
| DE | 102011016500 | 10/2012 |
| DE | 202017103230 | 7/2017 |
| DE | 202017003908 | 10/2017 |
| EP | 0133539 | 2/1985 |
| EP | 0537058 | 4/1993 |
| EP | 2990196 | 3/2016 |
| FR | 1241878 | 9/1960 |
| FR | 2705317 | 11/1994 |
| FR | 2820718 | 8/2002 |
| FR | 2821786 | 9/2002 |
| FR | 3016352 | 7/2015 |
| GB | 217683 | 6/1924 |
| GB | 235673 | 6/1925 |
| GB | 528289 | 1/1940 |
| GB | 713640 | 8/1954 |
| GB | 1204058 | 9/1970 |
| GB | 1305212 | 1/1973 |
| GB | 1372054 | 10/1974 |
| GB | 2400096 | 5/2006 |
| GB | 2516490 | 1/2015 |
| JP | 01254557 | 10/1989 |
| JP | 2005139582 | 6/2005 |
| JP | 2005247329 | 9/2005 |
| JP | 2012126440 | 7/2012 |
| WO | 8807476 | 10/1988 |
| WO | 9726192 | 7/1997 |
| WO | 9932374 | 7/1999 |
| WO | 2001070592 | 9/2001 |
| WO | 2014147425 | 9/2014 |
| WO | 2016187435 | 5/2016 |
| WO | 2016187435 A3 | 11/2016 |
| WO | 2018089365 | 5/2018 |
| WO | 2018093586 | 5/2018 |
| WO | 2018227047 | 12/2018 |
| WO | 2019125904 | 6/2019 |
| WO | 2019125906 | 6/2019 |
| WO | 2019226199 | 11/2019 |
| WO | 2020101939 | 5/2020 |
| WO | 2020102023 | 5/2020 |
| WO | 2020122921 | 6/2020 |
| WO | 2020222943 | 11/2020 |

OTHER PUBLICATIONS

US 10,899,530 B2, 01/2021, Sollie et al. (withdrawn)
US 10,899,531 B2, 01/2021, Sollie et al. (withdrawn)
Waltermire, Jamie; Final Office Action for U.S. Appl. No. 15/482,200, filed Apr. 7, 2017, dated Jan. 2, 2019, 23 pgs.
Waltermire, Jamie; Non-Final Office Action for U.S. Appl. No. 15/590,349, filed May 9, 2017, dated Nov. 5, 2018, 41 pgs.

(56) References Cited

OTHER PUBLICATIONS

Collison, Alan B.; Applicant Interview Summary for U.S. Appl. No. 15/677,738, filed Aug. 15, 2017, dated Dec. 5, 2018, 4 pgs.
Collison, Alan B.; Non-Final Office Action for U.S. Appl. No. 15/677,738, filed Aug. 15, 2017, dated Oct. 23, 2018, 11 pgs.
Periwrap; Article entitled: "Insulated Solutions", located at <https://www.peri-wrap.com/insulation/>, accessed on Dec. 3, 2018, 5 pgs.
Singh, et al; Article entitled: "Performance Comparison of Thermal Insulated Packaging Boxes, Bags and Refrigerants for Single-parcel Shipments", published Mar. 13, 2007, 19 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Waltermire, Jamie; Final Office Action for U.S. Appl. No. 15/590,345, filed May 9, 2017, dated Mar. 19, 2019, 42 pgs.
Waltermire, Jamie; Requirement for Restriction/Election for U.S. Appl. No. 15/482,186, filed Apr. 7, 2017, dated Apr. 17, 2019, 7 pgs.
Waltermire, Jamie; Requirement for Restriction/Election for U.S. Appl. No. 15/663,905, filed Jul. 31, 2017, dated Mar. 21, 2019, 8 pgs.
Sollie, Greg; Non-Final Office Action for U.S. Appl. No. 15/845,540, filed Dec. 18, 2017, dated Apr. 2, 2019, 50 pgs.
Collison, Alan B.; Final Office Action for U.S. Appl. No. 15/677,738, filed Aug. 15, 2017, dated Feb. 28, 2019, 14 pgs.
Cellulose Material Solutions, LLC; Brochure for Infinity Care Thermal Liner, accessed on Oct. 22, 2018, 2 pgs.
Uline; Article entitled: Corrugated Corner Protectors—4 x 4", accessed on Oct. 25, 2018, 1 pg.
DHL Express; Brochure for Dry Ice Shipping Guidelines, accessed on Oct. 26, 2018, 12 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Search Report and Written Opinion for PCT Application No. PCT/US18/65461, filed Dec. 13, 2018, dated Mar. 21, 2019, 13 pgs.
Sollie, Greg; International Search Report and Written Opinion for PCT/US18/65463, filed Dec. 13, 2018, dated Mar. 25, 2019, 11 pgs.
Collison, Alan B.; Applicant Interview Summary for U.S. Appl. No. 15/677,738, filed Aug. 15, 2017, dated Apr. 22, 2019, 4 pgs.
Sollie, Greg; Non-Final Office Action for U.S. Appl. No. 15/845,545, filed Dec. 18, 2017, dated Mar. 5, 2019, 41 pgs.
Waltermire, Jamie; Non-Final Office Action for U.S. Appl. No. 15/482,200, filed Apr. 7, 2017, dated Jun. 11, 2018, 36 pgs.
Waltermire, Jamie; Non-Final Office Action for U.S. Appl. No. 15/590,345, filed May 9, 2017, dated Aug. 24, 2018, 41 pgs.
Waltermire, Jamie; Requirement for Restriction/Election for U.S. Appl. No. 15/590,349, filed May 9, 2017, dated Aug. 30, 2018, 10 pgs.
Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials- Fiber-Based Materials", Sustainable Packaging Solution, 2009, 19 pgs.

Images of Novolex bag, including an outer paper bag, a corrugated cardboard insert, and an inner foil-covered bubble-wrap bag, publicly available prior to May 9, 2017, 7 pgs.
MP Global Products, LLC; International Search Report and Written Opinion of the International Searching Authority for PCT/US2017/060403, filed Nov. 7, 2017, dated Feb. 19, 2018, 15 pgs.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Salazar Packaging; Article entitle: "Custom Packaging and Design", located at <https://salazarpackaging.com/custom-packaging-and-design/>, accessed on Sep. 28, 2017, 2 pgs.
Tera-Pak; Article entitled: "Insulated Shipping Containers", located at <http://www.tera-pak.com/>, accessed on Mar. 20, 2017, 3 pgs.
Un Packaging; Article entitled: "CooLiner® Insulated Shipping Bags", available at <http://www.chem-tran.com/packaging/supplies/cooliner-insulated-shipping-bags.php>, accessed on Aug. 30, 2017, 2 pgs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers_html>, accessed on Sep. 28, 2017, 7 pgs.
Waltermire, Jamie; Notice of Allowance for U.S. Appl. No. 15/482,200, filed Apr. 7, 2017, dated May 14, 2019, 25 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/663,905, filed Jul. 31, 2017, dated Jun. 25, 2019, 66 pgs.
Sollie, Greg; Notice of Allowance for U.S. Appl. No. 15/845,545, filed Dec. 18, 2017, dated Jun. 19, 2019, 20 pgs.
Collison, Alan B.; Notice of Allowance for U.S. Appl. No. 15/677,738, filed Aug. 15, 2017, dated Jun. 19, 2019, 10 pgs.
Sollie, Greg; Non-Final Office Action for U.S. Appl. No. 16/280,595, filed Feb. 20, 2019, dated May 29, 2019, 60 pgs.
Sollie, Greg; International Search Report and Written Opinion for PCT Application No. PCT/US18/65459, filed Dec. 13, 2018, dated May 1, 2019, 15 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf, 23 pgs.
Waltermire, Jamie; Non-Final Office Action for U.S. Appl. No. 15/482,186, filed Apr. 7, 2017, dated Aug. 20, 2019, 81 pgs.
Waltermire, Jamie; Supplemental Notice of Allowance for U.S. Appl. No. 15/482,200, filed Apr. 7, 2017, dated Jul. 26, 2019, 9 pgs.
Waltermire, Jamie; Supplemental Notice of Allowance for U.S. Appl. No. 15/482,200, filed Apr. 7, 2017, dated Aug. 12, 2019, 7 pgs.
Waltermire, Jamie; Final Office Action for U.S. Appl. No. 15/663,905, filed Jul. 31, 2017, dated Aug. 22, 2019, 23 pgs.
Collison, Alan B.; Corrected Notice of Allowance for U.S. Appl. No. 15/677,738, filed Aug. 15, 2017, dated Jul. 15, 2019, 7 pgs.
Sollie, Greg; Requirement for Restriction/Election for U.S. Appl. No. 16/382,710, filed Apr. 12, 2019, dated Jul. 15, 2019, 6 pgs.
Sollie, Greg; Non-Final Office Action for U.S. Appl. No. 16/408,981, filed May 10, 2019, dated Aug. 20, 2019, 50 pgs.
Waltermire, Jamie; Corrected Notice of Allowance for U.S. Appl. No. 15/590,345, filed May 9, 2017, dated Feb. 18, 2020, 9 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Requirement for Restriction/Election for U.S. Appl. No. 16/526,555, filed Jul. 30, 2019, dated Jan. 17, 2020, 7 pgs.
Sollie, Greg; Non-Final Office Action for U.S. Appl. No. 15/845,540, filed Dec. 18, 2017, dated Feb. 19, 2020, 32 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Requirement for Restriction/Election for U.S. Appl. No. 16/401,603, filed May 2, 2019, dated Feb. 18, 2020, 6 pgs.

(56) References Cited

OTHER PUBLICATIONS

Sollie, Greg; International Search Report and Written Opinion for PCT Application No. PCT/US19/60486, filed Nov. 18, 2019, dated Jan. 13, 2020, 10 pgs.
Sollie, Greg; Invitation to Pay Additional Fees for PCT/US19/59764, filed Nov. 5, 2019, dated Jan. 2, 2020, 2 pgs.
Sollie, Greg; Final Office Action for U.S. Appl. No. 16/408,981, filed May 10, 2019, dated Feb. 24, 2020, 29 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Notice of Allowance for U.S. Appl. No. 15/590,345, filed May 9, 2017, dated Oct. 1, 2019, 28 pgs.
Waltermire, Jamie; Non-Final Office Action for U.S. Appl. No. 15/590,349, filed May 9, 2017, dated Sep. 5, 2019, 25 pgs.
Waltermire, Jamie; Non-Final Office Action for U.S. Appl. No. 16/381,678, filed Apr. 11, 2019, dated Sep. 9, 2019, 50 pgs.
Sollie, Greg; Corrected Notice of Allowance for U.S. Appl. No. 15/845,545, filed Dec. 18, 2017, dated Oct. 1, 2019, 7 pgs.
"Green Cell Foam Shipping Coolers", located at <https://www.greencellfoam.com/shipping-coolers>, accessed on Oct. 18, 2019, 4 pgs.
CooLiner® Insulated Shipping Bags, available at <http://www/chem-tran.com/packaging/supplies/cooliner-insulated-shipping-bags.php>, accessed on Oct. 18, 2019, 4 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/530,052, filed Aug. 2, 2019, dated Oct. 2, 2019, 12 pgs.
Sollie, Greg; Non-Final Office Action for U.S. Appl. No. 16/382,710, filed Apr. 12, 2019, dated Oct. 10, 2019, 49 pgs.
Periwrap; Article entitled: "Insulated Solutions", located at <https://www.peri-wrap.com/insulation/>, accessed on Dec. 3, 2018, 9 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Final Office Action for U.S. Appl. No. 15/590,349, filed May 9, 2017, dated Jan. 6, 2020, 26 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Notice of Allowance for U.S. Appl. No. 15/663,905, filed Jul. 31, 2017, dated Nov. 4, 2019, 18 pgs.
Waltermire, Jamie; Final Office Action for U.S. Appl. No. 16/381,678, filed Apr. 11, 2019, dated Dec. 30, 2019, 17 pgs.
Sollie, Greg; Corrected Notice of Allowance for U.S. Appl. No. 15/845,545, filed Dec. 18, 2017, dated Oct. 31, 2019, 12 pgs.
Sollie, Greg; Final Office Action for U.S. Appl. No. 15/845,540, filed Dec. 18, 2017, dated Oct. 30, 2019, 56 pgs.
Collison, Alan B.; Notice of Allowance for U.S. Appl. No. 15/677,738, filed Aug. 15, 2017, dated Oct. 29, 2019, 14 pgs.
Collison, Alan B.; Supplemental Notice of Allowance for U.S. Appl. No. 15/677,738, filed Aug. 15, 2017, dated Dec. 10, 2019, 4 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/530,052, filed Aug. 2, 2019, dated Dec. 27, 2019, 49 pgs.
Sollie, Greg; Non-Final Office Action for U.S. Appl. No. 16/567,192, filed Sep. 11, 2019, dated Dec. 10, 2019, 49 pgs.
Waltermire, Jamie; Notice of Allowance for U.S. Appl. No. 15/482,186, filed Apr. 7, 2017, dated Mar. 5, 2020, 29 pgs.
Waltermire, Jamie; Non-Final Office Action for U.S. Appl. No. 16/293,716, filed Mar. 6, 2019, dated May 5, 2020, 70 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Advisory Action for U.S. Appl. No. 16/381,678, filed Apr. 11, 2019, dated Feb. 26, 2020, 3 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Non-Final Office Action for U.S. Appl. No. 16/561,203, filed Sep. 5, 2019, dated May 6, 2020, 59 pgs.
Waltermire, Jamie; Requirement for Restriction/Election for U.S. Appl. No. 16/561,203, filed Sep. 5, 2019, dated Feb. 26, 2020, 5 pgs.
Sollie, Greg; Restriction Requirement for U.S. Appl. No. 16/552,277, filed Aug. 27, 2019, dated Apr. 20, 2020, 7 pgs.
Sollie, Greg; Applicant-Initiated Interview Summary for U.S. Appl. No. 16/280,595, filed Feb. 20, 2019 dated May 6, 2020, 3 pgs.
Sollie, Greg; Final Office Action for U.S. Appl. No. 16/280,595, filed Feb. 20, 2019, dated Mar. 24, 2020, 20 pgs.
Sollie, Greg; Non-Final Office Action for U.S. Appl. No. 16/530,052, filed Aug. 2, 2019, dated Mar. 3, 2020, 24 pgs.
Sollie, Greg; Non-Final Office Action for U.S. Appl. No. 16/401,603, filed May 2, 2019, dated Mar. 10, 2020, 67 pgs.
Sollie, Greg; Final Office Action for U.S. Appl. No. 16/382,710, filed Apr. 12, 2019, dated Apr. 6, 2020, 33 pgs.
Waltermire, Jamie; Corrected Notice of Allowance for U.S. Appl. No. 15/482,186, filed Apr. 7, 2017, dated Jun. 2, 2020, 10 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Final Office Action for U.S. Appl. No. 16/526,511, filed Jul. 30, 2019, dated May 19, 2020, 39 pgs.
Waltermire, Jamie; Non-Final Office Action for U.S. Appl. No. 16/526,511, filed Jul. 30, 2019, dated Jul. 10, 2020, 23 pgs.
Waltermire, Jamie; Applicant-Initiated Interview Summary for U.S. Appl. No. 16/530,045, filed Aug. 2, 2019, dated Jun. 15, 2020, 3 pgs.
Waltermire, Jamie; Non-Final Office Action for U.S. Appl. No. 16/530,045, filed Aug. 2, 2019, dated May 27, 2020, 38 pgs.
Waltermire, Jamie; Non-Final Office Action for U.S. Appl. No. 15/590,349, filed May 9, 2017, dated Jun. 12, 2020, 30 pgs.
Waltermire, Jamie; Final Office Action for U.S. Appl. No. 16/381,678, filed Apr. 11, 2019, dated Jun. 16, 2020, 8 pgs.
Sollie, Greg; Non-Final Office Action for U.S. Appl. No. 16/552,277, filed Aug. 27, 2019, dated Jun. 3, 2020, 68 pgs.
Collison, Alan B.; Applicant Interview Summary for U.S. Appl. No. 16/658,756, filed Oct. 21, 2019, dated May 6, 2020, 3 pgs.
Collison, Alan B.; Applicant Interview Summary for U.S. Appl. No. 16/658,756, filed Oct. 21, 2019, dated Jun. 29, 2020, 3 pgs.
Collison, Alan B.; Final Office Action for U.S. Appl. No. 16/658,756, filed Oct. 21, 2019, dated Jun. 17, 2020, 10 pgs.
Collison, Alan B.; Non-Final Office Action for U.S. Appl. No. 16/658,756, filed Oct. 21, 2019, dated Feb. 4, 2020, 14 pgs.
MP Global Products LLC: European Search Report for serial No. 17868605.1, dated Mar. 16, 2020, 7 pgs.
Collison, Alan B.; Non-Final Office Action for U.S. Appl. No. 16/414,309, filed May 16, 2019, dated Jul. 17, 2020, 77 pgs.
Collison, Alan B.; Requirement for Restriction/Election for U.S. Appl. No. 16/414,309, filed May 16, 2019, dated Jun. 16, 2020, 5 pgs.
Collison, Alan B.; Non-Final Office Action for U.S. Appl. No. 16/414,310, filed May 16, 2019, dated Jul. 8, 2020, 84 pgs.
Sollie, Greg; Advisory Action for U.S. Appl. No. 16/280,595, filed Feb. 20, 2019, dated Jul. 6, 2020, 3 pgs.
Sollie, Greg; Applicant-Initiated Interview Summary for U.S. Appl. No. 16/401,603, filed May 2, 2019, dated May 15, 2020, 3 pgs.
Sollie, Greg; Final Office Action for U.S. Appl. No. 16/401,603, filed May 2, 2019, dated Jun. 30, 2020, 13 pgs.
Sollie, Greg; Notice of Allowance for U.S. Appl. No. 16/382,710, filed Apr. 12, 2019, dated Jun. 3, 2020, 12 pgs.
Sollie, Greg; Final Office Action for U.S. Appl. No. 16/567,192, filed Sep. 11, 2019, dated Jun. 8, 2020, 20 pgs.

(56) References Cited

OTHER PUBLICATIONS

Sollie, Greg; International Preliminary Report on Patentability for PCT Application No. PCT/US18/65459, filed Dec. 13, 2018, dated Jul. 2, 2020, 11 pgs.
Sollie, Greg; International Preliminary Report on Patentability for PCT Application No. PCT/US18/65461, filed Dec. 13, 2018, dated Jul. 2, 2020, 12 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/59764, filed Nov. 5, 2019, dated Jul. 1, 2020, 13 pgs.
Waltermire, Jamie; Corrected Notice of Allowance for U.S. Appl. No. 15/482,186, filed Apr. 7, 2017, dated Sep. 2, 2020, 12 pgs.
Waltermire, Jamie; Notice of Allowance for U.S. Appl. No. 16/526,511, filed Jul. 30, 2019, dated Sep. 14, 2020, 18 pgs.
Waltermire, Jamie; Final Office Action for U.S. Appl. No. 16/293,716, filed Mar. 6, 2019, dated Sep. 10, 2020, 24 pgs.
Waltermire, Jamie; Final Office Action for U.S. Appl. No. 16/381,678, filed Apr. 11, 2019, dated Aug. 20, 2020, 21 pgs.
Waltermire, Jamie; Notice of Allowance for U.S. Appl. No. 16/381,678, filed Apr. 11, 2019, dated Jul. 30, 2020, 15 pgs.
Waltermire, Jamie; Final Office Action for U.S. Appl. No. 16/561,203, filed Sep. 5, 2019, dated Sep. 10, 2020, 25 pgs.
Waltermire, Jamie; Requirement for Restriction/Election for U.S. Appl. No. 16/689,433, filed Nov. 20, 2019, dated Oct. 16, 2020, 6 pgs.
Sollie, Greg; Final Office Action for U.S. Appl. No. 16/552,277, filed Aug. 27, 2019, dated Aug. 7, 2020, 19 pgs.
Sollie, Greg; Notice of Allowance for U.S. Appl. No. 16/552,277, filed Aug. 27, 2019, dated Aug. 31, 2020, 6 pgs.
Sollie, Greg; Final Office Action for U.S. Appl. No. 15/845,540, filed Dec. 18, 2017, dated Sep. 2, 2020, 28 pgs.
Sollie, Greg; Notice of Allowance for U.S. Appl. No. 15/845,540, filed Dec. 18, 2017, dated Sep. 17, 2020, 5 pgs.
Collison, Alan B.; Applicant-Initiated Interview Summary for U.S. Appl. No. 16/414,309, filed May 16, 2019, dated Aug. 21, 2020, 3 pgs.
Collison, Alan B.; Applicant-Initiated Interview Summary for U.S. Appl. No. 16/414,309, filed May 16, 2019, dated Oct. 15, 2020, 3 pgs.
Collison, Alan B.; Final Office Action for U.S. Appl. No. 16/414,309, filed May 16, 2019, dated Oct. 8, 2020, 15 pgs.
Collison, Alan B.; Applicant-Initiated Interview Summary for U.S. Appl. No. 16/414,310, filed May 16, 2019, dated Jul. 30, 2020, 3 pgs.
Collison, Alan; Final Office Action for U.S. Appl. No. 16/414,310, filed May 16, 2019, dated Oct. 13, 2020, 30 pgs.
Sollie, Greg; Non-Final Office Action for U.S. Appl. No. 16/280,595, filed Feb. 20, 2019, dated Aug. 28, 2020, 26 pgs.
Sollie, Greg; Final Office Action for U.S. Appl. No. 16/530,052, filed Aug. 2, 2019, dated Aug. 28, 2020, 29 pgs.
Sollie, Greg; Notice of Allowance for U.S. Appl. No. 16/401,603, filed May 2, 2019, dated Aug. 31, 2020, 14 pgs.
Sollie, Greg; Non-Final Office Action for U.S. Appl. No. 16/401,607, filed May 2, 2019, dated Aug. 19, 2020, 88 pgs.
Sollie, Greg; Corrected Notice of Allowance for U.S. Appl. No. 16/382,710, filed Apr. 12, 2019, dated Sep. 24, 2020, 9 pgs.
Sollie, Greg; Notice of Allowance for U.S. Appl. No. 16/567,192, filed Sep. 11, 2019, dated Aug. 7, 2020, 14 pgs.
Sollie, Greg; Non-Final Office Action for U.S. Appl. No. 16/408,981, filed May 10, 2019, dated Sep. 16, 2020, 40 pgs.
MP Global Products LLC: European Search Report Response for serial No. 17868605.1, filed Oct. 2, 2020, 15 pgs.
Waltermire, Jamie; Certificate of Correction for U.S. Appl. No. 15/482,186, filed Apr. 7, 2017, dated Dec. 29, 2020, 1 pg.
Waltermire, Jamie; Corrected Notice of Allowance for U.S. Appl. No. 15/590,349, filed May 9, 2017, dated Dec. 22, 2020, 9 pgs.
Waltermire, Jamie; Corrected Notice of Allowance for U.S. Appl. No. 15/590,349, filed May 9, 2017, dated Feb. 5, 2021, 9 pgs.
Waltermire, Jamie; Non-Final Office Action for U.S. Appl. No. 16/293,716, filed Mar. 6, 2019, dated Feb. 5, 2021, 18 pgs.
Waltermire, Jamie; Corrected Notice of Allowance for U.S. Appl. No. 16/561,203, filed Sep. 5, 2019, dated Jan. 5, 2021, 9 pgs.
Waltermire, Jamie; Corrected Notice of Allowance for U.S. Appl. No. 16/561,203, filed Sep. 5, 2019, dated Feb. 5, 2021, 8 pgs.
Waltermire, Jamie; Non-Final Office Action for U.S. Appl. No. 16/689,407, filed Nov. 20, 2019, dated Jan. 8, 2021, 92 pgs.
Sollie, Greg; Corrected Notice of Allowance for U.S. Appl. No. 16/552,277, filed Aug. 27, 2019, dated Dec. 22, 2020, 7 pgs.
Sollie, Greg; Corrected Notice of Allowance for U.S. Appl. No. 16/552,277, filed Aug. 27, 2019, dated Feb. 9, 2021, 9 pgs.
Solie, Greg; Corrected Notice of Allowance for U.S. Appl. No. 15/845,540, filed Dec. 18, 2017, dated Dec. 21, 2020, 9 pgs.
Sollie, Greg; Corrected Notice of Allowance for U.S. Appl. No. 15/845,540, filed Dec. 18, 2017, dated Feb. 12, 2021, 8 pgs.
Collison, Alan B.; Corrected Notice of Allowance for U.S. Appl. No. 16/658,756, filed Oct. 21, 2019, dated Jan. 28, 2021, 3 pgs.
MP Global Products LLC: Office Action for European application No. 17868605.1, dated Dec. 3, 2020, 4 pgs.
MP Global Products, LLC; Examination Report for Australian patent application No. 2017359035, dated Nov. 27, 2020, 3 pgs.
MP Global Products, LLC; Office Action for Chinese patent application No. 201780081689.7, dated Nov. 2, 2020, 17 pgs.
Collison, Alan B.; Non-Final Office Action for U.S. Appl. No. 17/123,676, filed Dec. 16, 2020, dated Feb. 3, 2021, 23 pgs.
Sollie, Greg; Final Office Action for U.S. Appl. No. 16/280,595, filed Feb. 20, 2019, dated Dec. 30, 2020, 25 pgs.
Sollie, Greg; Non-Final Office Action for U.S. Appl. No. 16/530,052, filed Aug. 2, 2019, dated Dec. 18, 2020, 17 pgs.
Sollie, Greg; Corrected Notice of Allowance for U.S. Appl. No. 16/401,607, filed May 2, 2019, dated Jan. 4, 2021, 9 pgs.
Sollie, Greg; Certificate of Correction for U.S. Appl. No. 16/567,192, filed Sep. 11, 2019, dated Feb. 16, 2021, 1 pg.
Sollie, Greg; Final Office Action for U.S. Appl. No. 16/408,981, filed May 10, 2019, dated Dec. 29, 2020, 22 pgs.
Sollie, Greg; Requirement for Restriction/Election for U.S. Appl. No. 16/886,040, filed May 28, 2020, dated Dec. 23, 2020, 6 pgs.
MP Global Products, LLC; First Examination Report for Australian patent application No. 2017359035, filed Nov. 7, 2017, dated Nov. 27, 2020, 3 pgs.
MP Global Products LLC: European Office Action for application No. 17868605.1, dated Dec. 3, 2020, 4 pgs.
MP Global Products LLC: European Office Action Response for application No. 17868605.1, filed Jan. 19, 2021, 15 pgs.
Waltermire, Jamie; Corrected Notice of Allowance for U.S. Appl. No. 16/526,511, filed Jul. 30, 2019, dated Oct. 30, 2020, 14 pgs.
Waltermire, Jamie; Corrected Notice of Allowance for U.S. Appl. No. 16/526,511, filed Jul. 30, 2019, dated Nov. 30, 2020, 9 pgs.
Waltermire, Jamie; Final Office Action for U.S. Appl. No. 16/530,045, filed Aug. 2, 2019, dated Nov. 24, 2020, 40 pgs.
Waltermire, Jamie; Non-Final Office Action for U.S. Appl. No. 16/164,933, filed Oct. 19, 2018, dated Nov. 18, 2020, 104 pgs.
Waltermire, Jamie; Notice of Allowance for U.S. Appl. No. 15/590,349, filed May 9, 2017, dated Oct. 20, 2020, 20 pgs.
Waltermire, Jamie; Final Office Action for U.S. Appl. No. 16/293,716, filed Mar. 6, 2019, dated Oct. 29, 2020, 19 pgs.
Waltermire, Jamie; Non-Final Office Action for U.S. Appl. No. 16/526,555, filed Jul. 30, 2019, dated Oct. 27, 2020, 39 pgs.
Waltermire, Jamie; Final Office Action for U.S. Appl. No. 16/381,678, filed Apr. 11, 2019, dated Oct. 19, 2020, 24 pgs.
Waltermire, Jamie; Notice of Allowance for U.S. Appl. No. 16/561,203, filed Sep. 5, 2019, dated Nov. 3, 2020, 14 pgs.
Waltermire, Jamie; Requirement for Restriction/Election for U.S. Appl. No. 16/689,407, filed Nov. 20, 2019, dated Oct. 29, 2020, 6 pgs.
Ivaltermire, Jamie; Corrected Notice of Allowance for U.S. Appl. No. 15/590,349, filed May 9, 2017, dated Nov. 2, 2020, 9 pgs.
Sollie, Greg; Corrected Notice of Allowance for U.S. Appl. No. 16/552,277, filed Aug. 27, 2019, dated Nov. 5, 2020, 9 pgs.

(56) References Cited

OTHER PUBLICATIONS

Collison, Alan B.; Advisory Action for U.S. Appl. No. 16/658,756, filed Oct. 21, 2019, dated Sep. 25, 2020, 4 pgs.
Collison, Alan B.; Notice of Allowance for U.S. Appl. No. 16/658,756, filed Oct. 21, 2019, dated Oct. 23, 2020, 10 pgs.
Collison, Alan B.; Corrected Notice of Allowance for U.S. Appl. No. 16/414,309, filed May 16, 2019, dated Nov. 16, 2020, 10 pgs.
Collison, Alan B.; Corrected Notice of Allowance for U.S. Appl. No. 16/414,309, filed May 16, 2019, dated Nov. 27, 2020, 9 pgs.
Collison, Alan B.; Notice of Allowance for U.S. Appl. No. 16/414/309, filed May 16, 2019, dated Oct. 21, 2020, 6 pgs.
Collison, Alan B.; Notice of Allowance for U.S. Appl. No. 16/414,310, filed May 16, 2019, dated Nov. 13, 2020, 15 pgs.
Collison, Alan B.; Supplemental Notice of Allowance for U.S. Appl. No. 16/414,310, filed May 16, 2019, dated Dec. 3, 2020, 8 pgs.
Sollie, Greg; Corrected Notice of Allowance for U.S. Appl. No. 16/401,603, filed May 2, 2019, dated Nov. 24, 2020, 8 pgs.
Sollie, Greg; Corrected Notice of Allowance for U.S. Appl. No. 16/401,603, filed May 2, 2019, dated Nov. 3, 2020, 9 pgs.
Sollie, Greg; Notice of Allowance for U.S. Appl. No. 16/401,607, filed May 2, 2019, dated Dec. 4, 2020, 12 pgs.
Sollie, Greg; Notice of Allowance for U.S. Appl. No. 16/382,710, filed Apr. 12, 2019, dated Oct. 21, 2020, 5 pgs.
Sollie, Greg; Corrected Notice of Allowance for U.S. Appl. No. 16/567,192, filed Sep. 11, 2019, dated Oct. 20, 2020, 8 pgs.
Sollie, Greg; International Preliminary Report on Patentability for PCT/US18/65463, filed Dec. 13, 2018, dated Dec. 3, 2020, 9 pgs.
Waltermire, Jamie; Final Office Action for U.S. Appl. No. 16/526,555, filed Jul. 30, 2019, dated Mar. 8, 2021, 25 pgs.
Waltermire, Jamie; Non-Final Office Action for U.S. Appl. No. 16/381,678, filed Apr. 11, 2019, dated Mar. 5, 2021, 36 pgs.
Waltermire, Jamie; Final Office Action for U.S. Appl.No. 16/689,407, filed Nov. 20, 2019, dated Apr. 23, 2021, 18 pgs.
Waltermire, Jamie; Non-Final Office Action for U.S. Appl. No. 16/689,433, filed Nov. 20, 2019, dated Feb. 23, 2021, 88 pgs.
Collison, Alan B.; Certificate of Correction for U.S. Appl. No. 16/414/309, filed May 16, 2019, dated Mar. 9, 2021, 1 pg.
Collison, Alan B.; Non-Final Office Action for U.S. Appl. No. 17/123,673, filed Dec. 16, 2020, dated Mar. 23, 2021, 86 pgs.
Sollie, Greg; Non-Final Office Action for U.S. Appl. No. 16/280,595, filed Feb. 20, 2019, dated Apr. 9, 2021, 20 pgs.
Sollie, Greg; Final Office Action for U.S. Appl. No. 16/530,052, filed Aug. 2, 2019, dated Apr. 20, 2021, 27 pgs.
Sollie, Greg; Corrected Notice of Allowance for U.S. Appl. No. 16/401,607, filed May 2, 2019, dated Mar. 15, 2021, 13 pgs.
Sollie, Greg; Requirement for Restriction/Election for U.S. Appl. No. 16/879,811, filed May 21, 2020, dated Apr. 15, 2021, 6 pgs.
Sollie, Greg; Corrected Notice of Allowance for U.S. Appl. No. 16/408,981, filed May 10, 2019, dated Mar. 15, 2021, 9 pgs.
Sollie, Greg; Notice of Allowance for U.S. Appl. No. 16/408,981, filed May 10, 2019, dated Feb. 23, 2021, 6 pgs.
Sollie, Greg; Non-Final Office Action for U.S. Appl. No. 16/886,040, filed May 28, 2020, dated Mar. 30, 2021, 39 pgs.
MP Global Products LLC: European Office Action for application No. 17868605.1, dated Apr. 13, 2021, 3 pgs.

* cited by examiner

LINER

TECHNICAL FIELD

This disclosure relates to packaging. More specifically, this disclosure relates to liners for packaging.

BACKGROUND

Packaging can sometimes require insulation, although in various aspects, insulation may not be included. In various aspects, insulation packaging can be complex and require complicated manufacture and assembly.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A liner includes a liner subassembly, the liner subassembly comprising a body portion, the body portion comprising a front, a back, a first side, a second side, and a bottom, the body portion defining a cavity; and a flap portion hingedly connected to a top end of the back, the flap portion sized to cover the cavity; and a support connected to the bottom, the support comprising a central body and two end portions, each end portion hingedly connected to the central body, wherein the body portion and the flap portion comprise insulated walls.

A packaging assembly includes a box, the box comprising a front, a back, a first side, a second side, and a bottom; a liner, the liner comprising a liner subassembly, the liner subassembly comprising a liner panel assembly, the liner panel assembly comprising an insulative batt, the insulative batt being bendable; and at least two panels connected together and enclosing the insulative batt; the liner panel assembly defining a first panel section adjacent to a second panel section and a flap panel section adjacent to the second panel section, wherein each of the first panel section and the second panel section defines a first sealing edge and a second sealing edge, wherein the first sealing edge of the first panel section is connected to the first sealing edge of the second panel section and wherein the second sealing edge of the first panel section is connected to the second sealing edge of the second panel section; and a support connected to the first panel and the second panel at an end of the liner subassembly distal to the flap panel section, the support comprising a central body and two end portions, each end portion hingedly connected to the central body along a bend line, the support comprising a lengthwise bend line, the lengthwise bend line defining a first half and a second half of the support, wherein the first half is connected to the first panel section and the second half is connected to the second panel section, wherein the liner defines a body portion positioned in the box, the body portion comprising a front, a back, a first side, a second side, and a bottom, the body portion defining a cavity, and wherein the flap panel section defines a flap portion hingedly connected to a top end of the back of the body portion, the flap portion sized to cover the cavity; and wherein the cavity is defined by separation of the first half and the second half of the support.

A method of assembling a packaging assembly includes the steps of obtaining a box, the box comprising a front, a back, a first side, a second side, and a bottom; obtaining a liner, the liner comprising a liner subassembly and a support, the liner subassembly comprising an insulative batt, the insulative batt being bendable; and at least two panels connected together and enclosing the insulative batt; the liner panel assembly defining a first panel section adjacent to a second panel section and a flap panel section adjacent to the second panel section, wherein each of the first panel section and the second panel section defines a first sealing edge and a second sealing edge, wherein the first sealing edge of the first panel section is connected to the first sealing edge of the second panel section and wherein the second sealing edge of the first panel section is connected to the second sealing edge of the second panel section; and the support the support comprising a central body and two end portions, each end portion hingedly connected to the central body along a bend line, the support comprising a lengthwise bend line defining a first half and a second half of the support, wherein the first half of the support is connected to the first panel section and the second half of the support is connected to the second panel section; wherein the liner is arranged in a laid-flat configuration such that the first panel section is in contact with the second panel section and such that the support is hinged along the lengthwise bend line; inserting the liner within the box, wherein inserting the liner within the box comprises bending each end portion hingedly with respect to the central body, whereby the first half of the support is hinged with respect to the second half of the support by bending of the end portions, whereby a cavity is formed between the first panel section and the second panel section; and folding the flap portion relative to the body portion to enclose the cavity.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
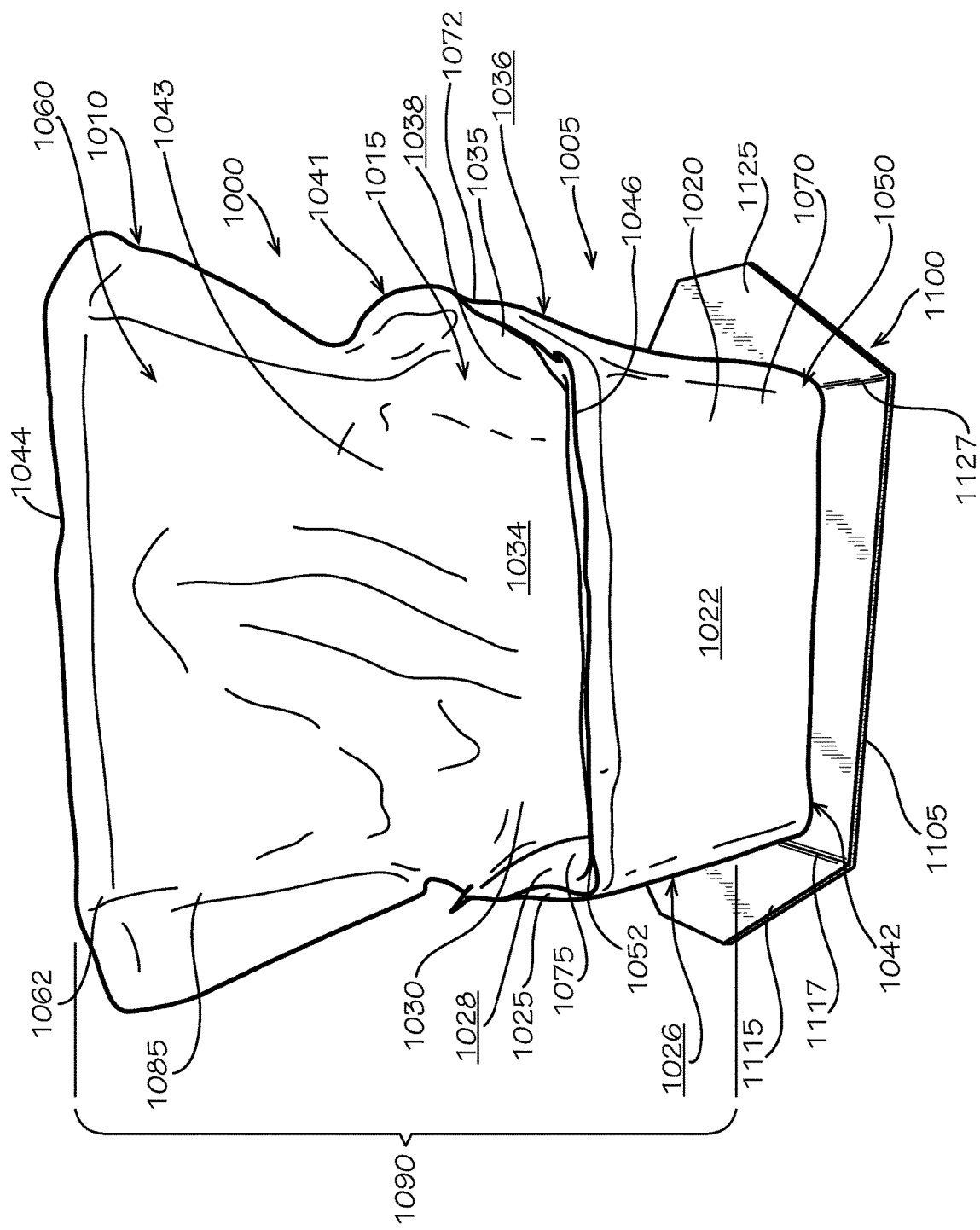
FIG. 1 is a front perspective view of a liner in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a liner and associated methods, systems, devices, and various apparatus. The liner can include insulation in various implementations. It would be understood by one of skill in the art that the disclosed liner is described in but a few exemplary aspects among many. No particular terminology or description should be considered limiting on the disclosure or the scope of any claims issuing therefrom.

One embodiment of a liner 1000 is disclosed and described with reference to FIG. 1. The liner 1000 can broadly define a body portion 1005 and a flap portion 1010. In various aspects, the liner 1000 can be of various shapes. In various aspects, the shapes of the liner 1000 can be arranged or shaped to accommodate various packaging styles and shapes. In the current aspect, the body portion 1005 can be substantially block-shaped or box-shaped to accommodate box-shaped packaging. The body portion 1005 can define a cavity 1015. The body portion 1005 can comprise a front 1020, a side 1025, a back 1030, and another side 1035 that together can define the cavity 1015. The front 1020 can comprise an outer surface 1022 and an inner surface 1024 (shown in FIG. 6B). The back 1030 can comprise an outer surface 1032 (shown as part of the flap portion 1010 in FIG. 6B) and an inner surface 1034. The side 1025 can comprise an outer surface 1026 and an inner surface 1028. The side 1035 can comprise an outer surface 1036 and an inner surface 1038.

The body portion 1005 can define an upper end 1041 and a lower end 1042. The lower end 1042 of the body portion 1005 can comprise a bottom (not shown). In the current aspect, the bottom can be substantially similar in construction and materials as the front 1020, back 1030, and sides 1025,1035.

The flap portion 1010 can comprise a body connection end 1043 that can serve the connection of the flap portion 1010 to the body portion 1005. The flap portion 1010 can comprise a flap end 1044 that can serve as an end of the flap portion 1010.

The liner 1000 can comprise a skin material and a filler material. The skin material can be of various constructions, materials, shapes, and purposes, including but not limited to plastic films, paper materials, cloth, and like materials. In the current aspect, the skin material can be kraft paper. In various aspects, the filler material can be a variety of materials, including thermally insulative and/or protective materials. In the current aspect, the insulative material can be paper fill material. In various aspects, the insulative material can be loose fill insulation such as paper, cellulose, or various foam materials such as polystyrene. In various aspects, the insulative material can be open-cell or closed-cell foams. In various aspects, the insulative material can be a paper and fiber combination and can be in loose fill form or in batt form. In various aspects, the insulative material can be loose fill, batt, board, or other applications.

In the current aspect, the skin material can be joined at a seam such as seam 1046 seen at the upper end 1041 of the body portion. In certain aspects, the liner 1000 of the current disclosure can be formed of two pieces of kraft paper comprising an inner panel and an outer panel. In such aspects, the seam 1046 can continue along the flap portion 1010 to the flap end 1044 in various aspects. In various aspects, the liner 1000 can comprise three panels, comprising an inner panel and two outer panels. In the current aspect, the liner 1000 can comprise four panels. Two panels can be joined together to form a front half 1050 of the liner 1000 and two panels can be joined together to form a rear half 1060 of the liner 1000; the two halves can then be joined at a seam in the body portion 1005. In the current aspect, the liner 1000 can comprise an outer front panel 1070, and inner front panel 1075, an outer rear panel 1080 (shown in FIG. 6B) and an inner rear panel 1085. The various panels in the current aspect can be sheets of kraft paper. The front half 1050 can be joined using a seam 1052 or joint that can be joined around the perimeter of the panels 1070, 1075. Between the panels 1070,1075 can be captured an amount of insulative or filler material, as previously discussed. The rear half 1060 of the liner 1000 can be joined using a seam 1062 or joint to join the perimeter of panels 1080, 1085. Insulative material can similarly be captured within the rear half 1060. The front half 1050 and the rear half 1060 can be joined at a seam 1072 that can extend substantially along the body portion 1005. In the current aspect, the seam 1072 can join portions of the seam 1052 and the seam 1062 together.

The various panels can be joined at seams (such as seams 1046,1052,1062,1072) by adhesive, chemical joining, mechanical joints, welds such as sonic welding, sewing, or various other joint mechanisms known in the art. In various aspects, the seams can be joined using staples, key fit arrangements, interference, or co-forming. In various aspects, the joints or seams can be eliminated in favor of integrated construction, and various modifications to the arrangements of joints or seams can be utilized without departing from the scope of this disclosure. Additional numbers of panels or seams may be utilized to modify the structure of the liner 1000 within the scope of the current disclosure.

The front half 1050 and the rear half 1060 can be comprised within a liner subassembly 1090 that can form the portions of the liner 1000 previously described. The liner 1000 in the current aspect can be a liner assembly and can comprise a support 1100 connected to or abutting the bottom of the liner subassembly 1090. The support 1100 can be of varying constructions and can be designed to provide structure and support to the liner 1000 and as separate from the liner subassembly 1090, which can in some aspects be unstructured. In various aspects, the liner subassembly 1090 can comprise structures connected to or within the front half 1050 and/or the rear half 1060 to provide support. In the current aspect, the support 1100 can be connected to the bottom of the liner subassembly 1090 to provide structure and support that can be lacking.

The support 1100 can be connected to the bottom of the liner subassembly 1090 by adhesive or mechanical joints as described elsewhere in this disclosure. The support 1100 can be formed of corrugated cardboard material. In various aspects, the support 1100 can be formed of cardboard, paperboard, wood, plastic, or various other rigid or semi-rigid materials. In various aspects, the support 1100 can comprise a framework. In various aspects, the support 1100 can comprise mechanical joints or hinges.

Figure 2:
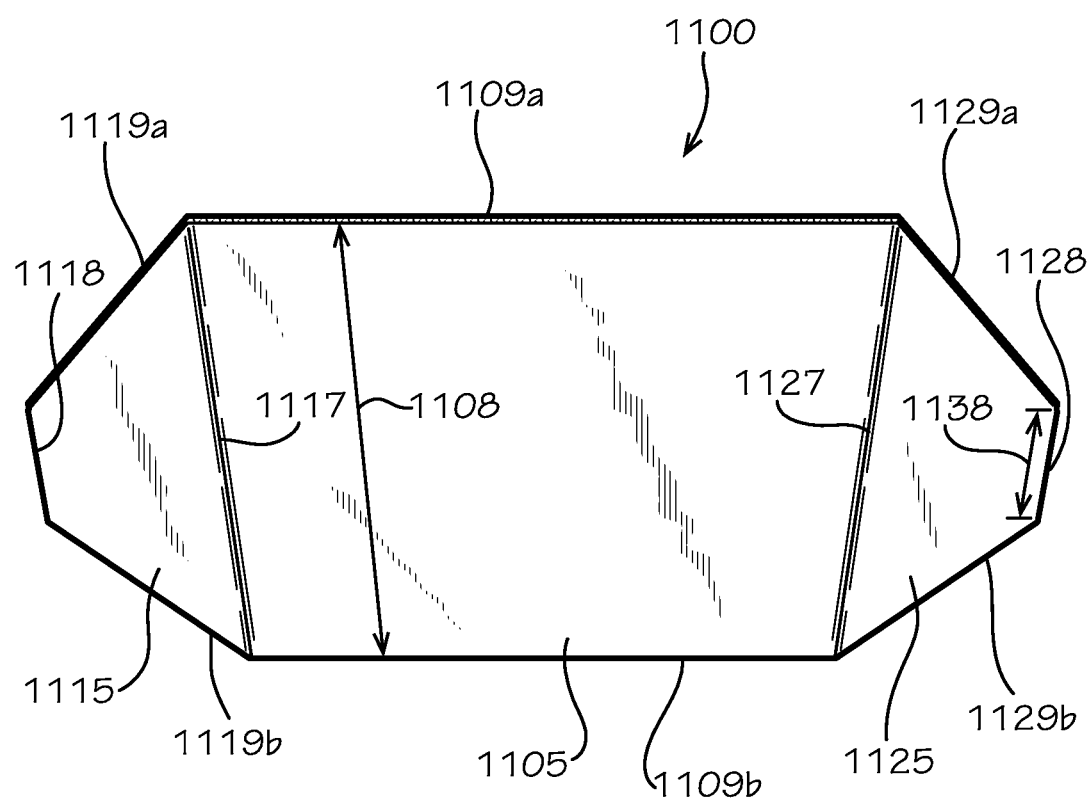
FIG. 2 is a bottom perspective view of the liner of FIG. 1.

As seen with reference to FIGS. 1-2, the support 1100 can comprise a central body 1105, a first end portion 1115, and a second end portion 1125. The central body 1105 of the current aspect can be about rectangular in shape, and the end portions 1115,1125 can be about trapezoidal in shape and can taper from the central body 1105 outwards. The end portions 1115,1125 can be connected to the central body 1105 by bend lines 1117,1127, respectively. The bend lines 1117,1127 can be hinges, living hinges, perforations, score lines, or various other mechanical arrangements known to one of skill in the art in various aspects.

As seen with specific reference to FIG. 2, the central body 1105 can define parallel ends 1109a,b. Further, each end portion 1115,1125 can include tapered ends 1119a,b and 1129a,b, respectively. The tapered ends 1119a,b,1129a,b, can terminate into a nose end 1118, 1128. In the current aspect, tapered ends 1119a,b,1129a,b, can be arranged at about a 45° angle with respect to the ends 1109a,b. In various aspects, the tapered ends 1119a,b,1129a,b can be arranged at varying angles from as small as 30° to as large as 75°. In the current aspect, a length 1138 of the nose ends 1118,1128 can be about one-fourth of a width 1108 of the central body 1105. In various aspects, the length 1138 can be about one-third of the width 1108. In various aspects, the length 1138 can be about one-fifth of the width 1108. In various aspects, the length 1138 can be as little as one-sixth and as great as three-fourths of the width 1108. The taper defined by the tapered ends 1119a,b,1129a,b, can be beneficial in reducing resistance when assembling the liner 1000 into packaging.

Figure 3:
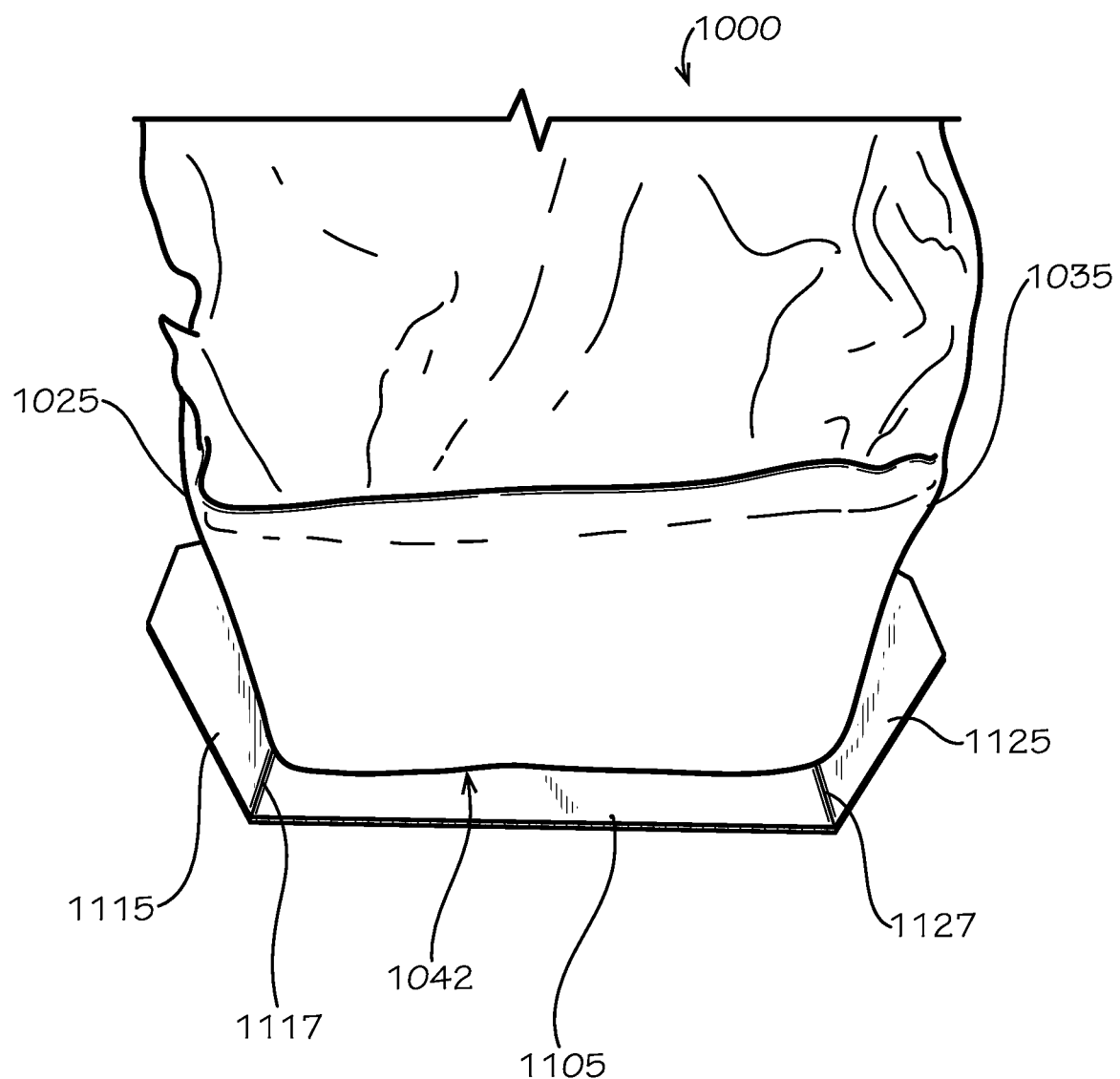
FIG. 3 is a front perspective view of the liner of FIG. 1.

As seen with reference to FIG. 3, the end portions 1115,1125 can be bent or hinged with respect to the central body 1105 along bend lines 1117,1127. As the end portions 1115,1125 are bent, the end portions 1115,1125 can provide support for the sides 1025,1035 proximate the lower end 1042.

Figure 4A:
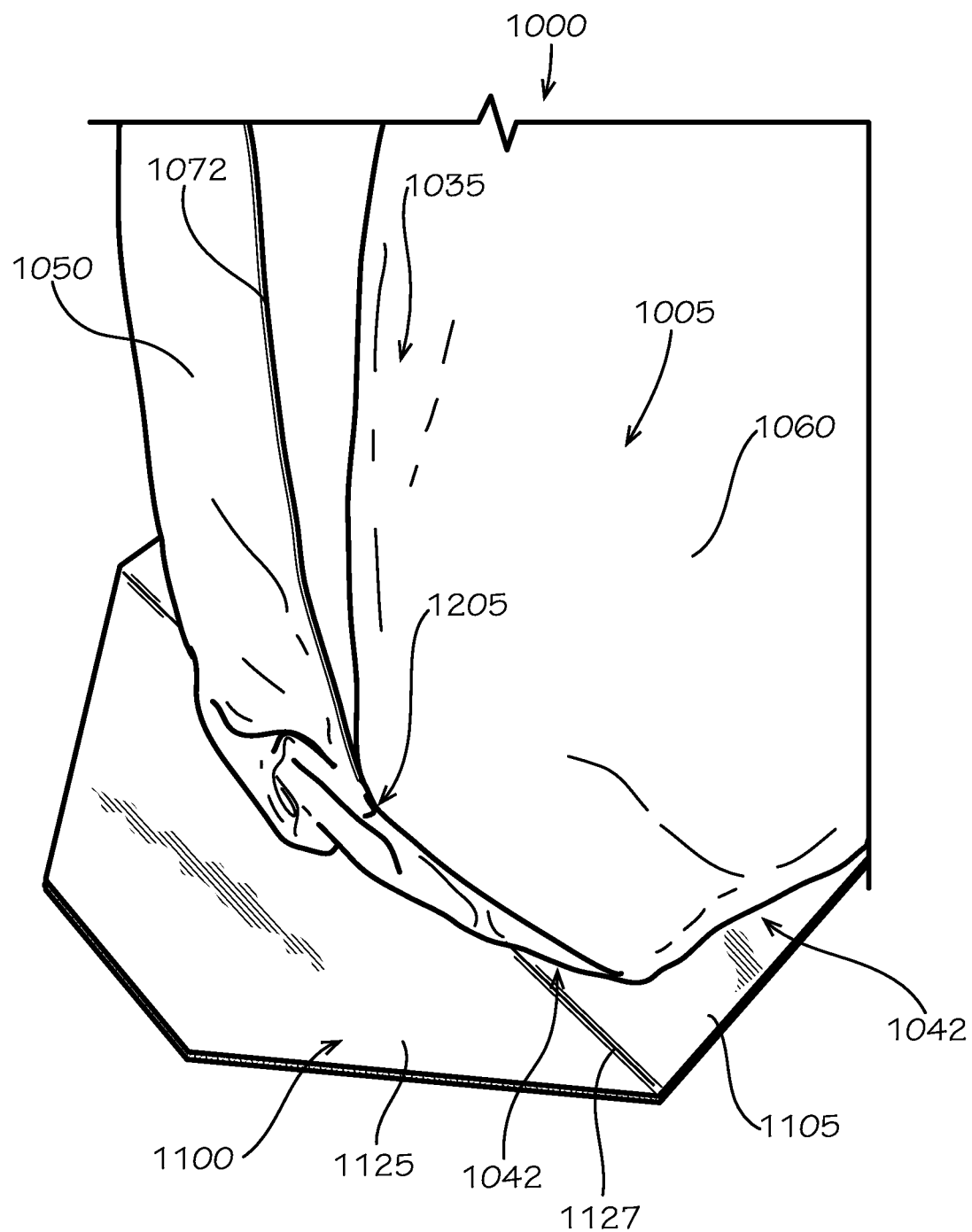
FIG. 4A is a close-up perspective view of a pleat of the liner of FIG. 1.
Figure 4B:
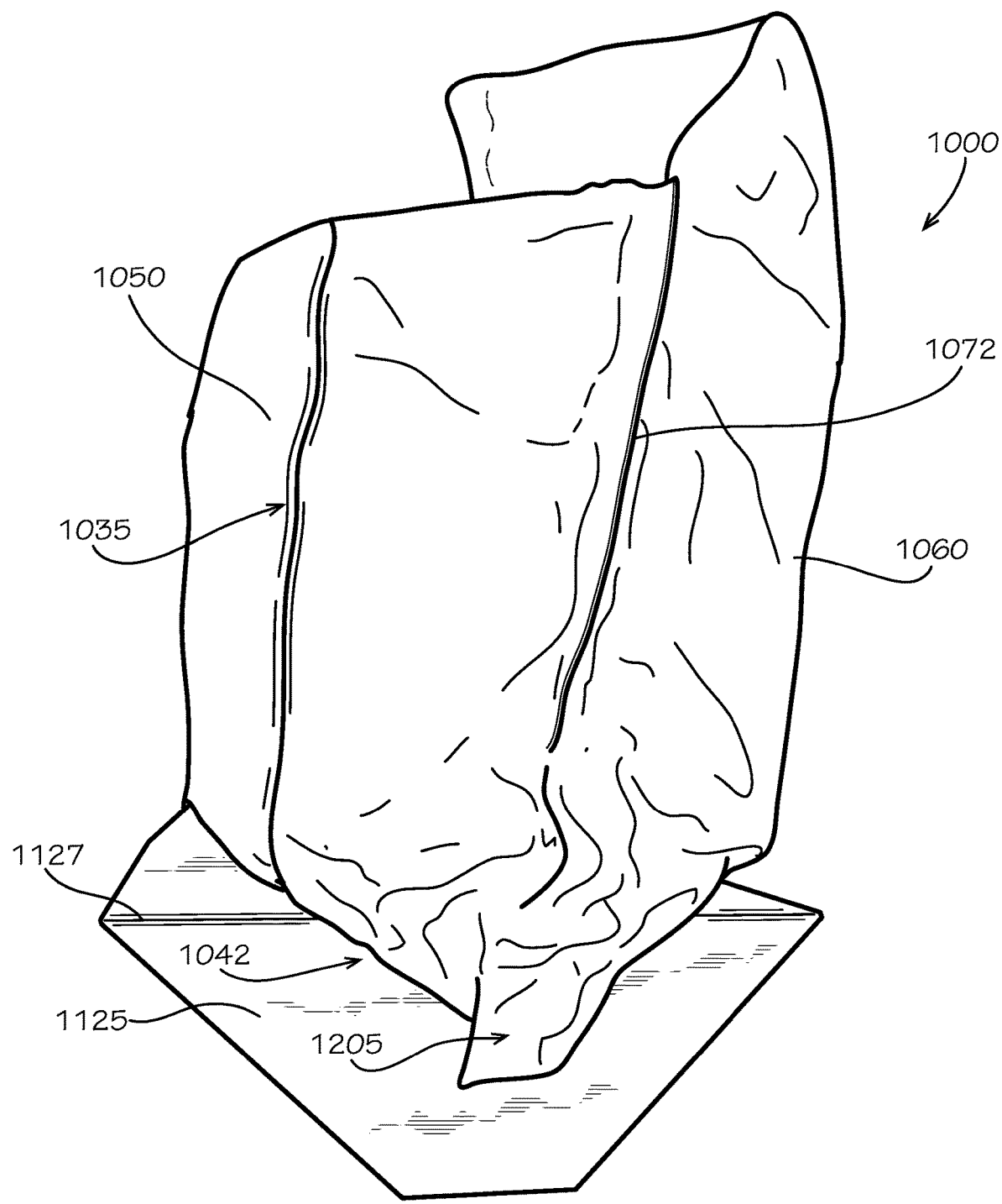
FIG. 4B is a close-up perspective view of the pleat of FIG. 4A expanded.

As seen with reference to FIGS. 4A-4B, proximate the lower end 1042 of the body portion 1005 and abutting with the support 1100 can be a pleat 1205 or a gathering of material. In the current aspect, the pleat 1205 can be simply an overlap of material from the joint along the seam 1072 between the front half 1050 and the rear half 1060. In various aspects, the pleat 1205 can be crumpled, folded, or otherwise mechanically arranged to create a region of excess material along a lower end 1042 of the body portion 1005 proximate the sides 1025,1035. Because of the location of the pleat 1205, the excess material can serve as a spring to the end portions 1115,1125 such that the end portions 1115,1125 can be biased to rotate outwardly along bend lines 1117,1127. Such spring force can be minimal, as it can be based entirely on the shape memory of the liner 1000; however, such spring force can be beneficial in helping secure the liner 1000 snugly within packaging while still allowing a user to assemble the liner 1000 within the packaging with minimal effort. Additionally, the arrangement of the pleats 1205 can be beneficial in providing said spring force with minimal additional materials, which itself can aid in recyclability of the liner 1000 as a whole and which can aid in ease of manufacturability, since the materials utilized to produce the liner 1000 can be minimal. In various aspects, the liner 1000 itself can be greater than 85% repulpable. In various aspects, the liner 1000 can be at least 80% repulpable.

Figure 5:
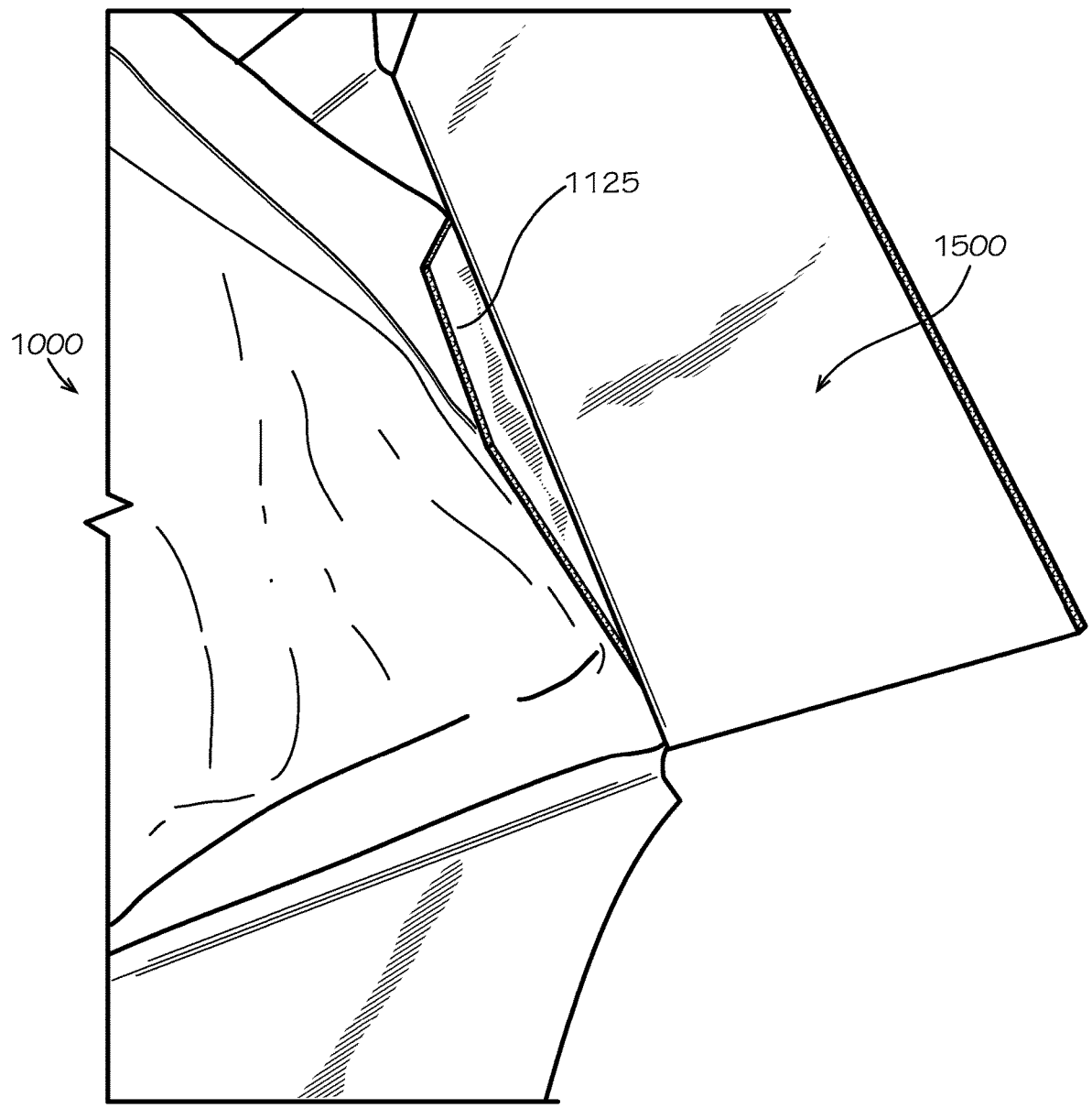
FIG. 5 is a close-up perspective view of the liner of FIG. 1 as being assembled into a box.

Assembly of the liner 1000 into a packaging assembly can be seen beginning with reference to FIG. 5. A box 1500 can be seen arranged proximate to the liner 1000. To begin insertion of the liner 1000 within the box 1500 to form the packaging assembly, the end portions 1115,1125 (1115 not seen in the current view) are folded along the bend lines 1117,1127, respectively, and the support 1100 can be arranged proximate a top end of the box 1500. When arranged, the central body 1105 of the support 1100 can be sized to fit within the box 1500 when the end portions 1115,1125 are folded along the bend lines 1117,1127. In the arrangement of FIG. 5, the pleats 1205 (not visible in the current view) can provide spring force against the end portions 1115,1125 to force the end portions 1115,1125 into contact with the box 1500. However, the weight of the liner 1000 can overcome the spring force and allow the liner 1000 to fall within the box 1500 in various aspects. In various aspects, the liner 1000 can be required to be manually inserted by a user, who can be required to push the liner 1000 into the box 1500 using human force. As previously noted, the taper defined by the tapered ends 1119*a,b*,1129*a,b*, can be beneficial in reducing resistance when assembling the liner 1000 into the box 1500 or other packaging.

Figure 6A:
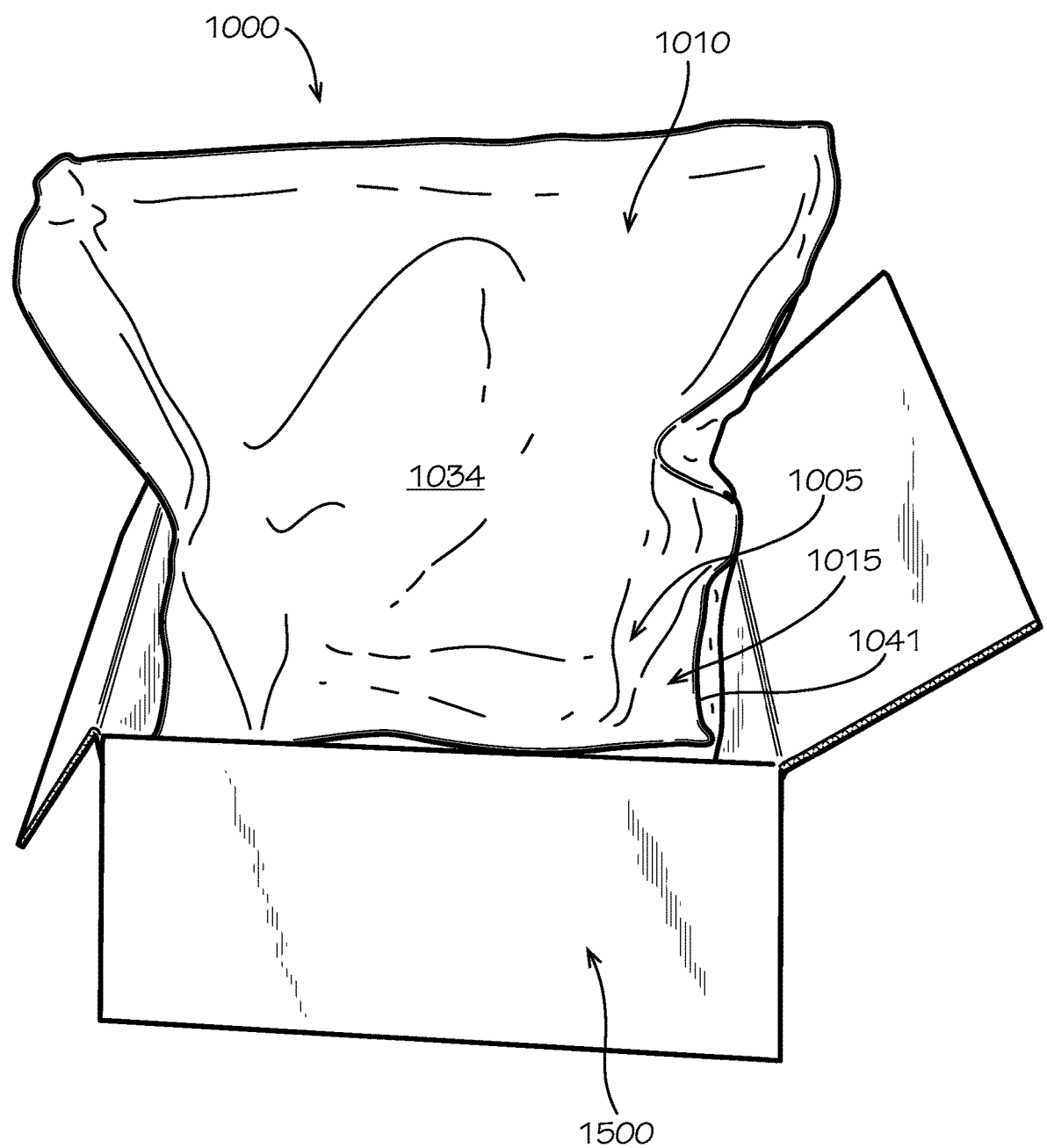
FIG. 6A is a front perspective view of the liner of FIG. 1 assembled into a box, thereby forming a packaging assembly.
Figure 6B:
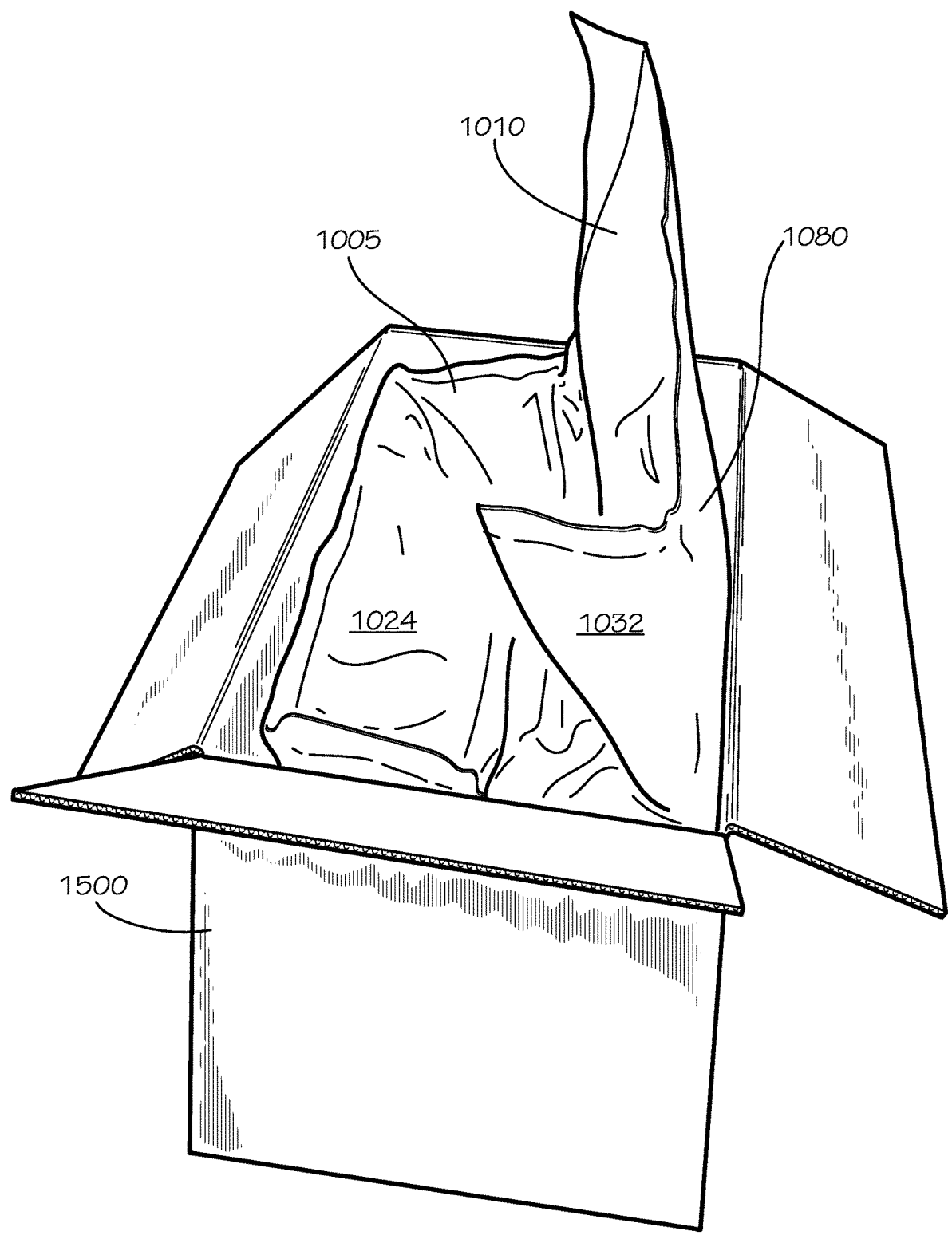
FIG. 6B is a side perspective view of the packaging assembly of FIG. 6A.
Figure 7:
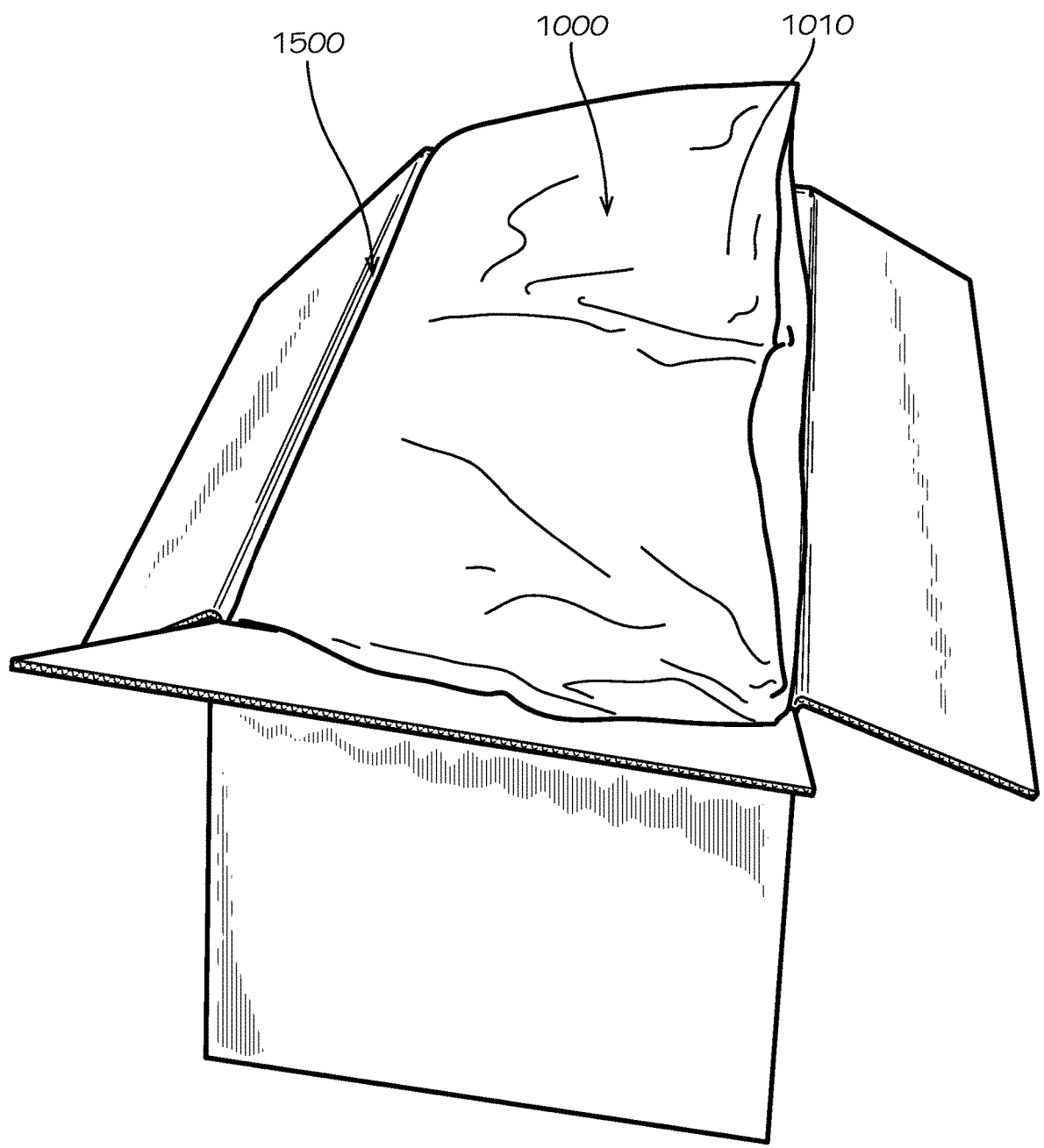
FIG. 7 is a perspective view of the packaging assembly of FIG. 6A with a flap portion folded.

As seen with reference to FIGS. 6A-6B, the liner 1000 can be arranged to fit snugly within the box 1500. As can be seen, benefits of the kraft paper and insulation construction can allow the liner 1000 to substantially maintain its general shape while still being malleable within the box 1500 to fill an inside of the box 1500 substantially while maintaining a shape of the cavity 1015. As a result, the liner 1000 can substantially insulate materials inserted within it while being a simple construction that is easy to form into a packaging assembly. As can be seen, the liner 1000 can be sized such that the upper end 1041 can be located substantially close to an upper end of the box 1500, as such an arrangement can provide heightened insulative value. As seen with reference to FIG. 7, the liner 1000 can be fully packaged by folding the flap portion 1010 down over the cavity 1015 such that the flap portion 1010 at least partially contacts the upper end 1041. The flap portion 1010 can be connected to the upper end 1041 of the body portion 1005 utilizing various adhesives, mechanical fasteners, or various other joints as known in the art. In various aspects, the flap portion 1010 can be folded over the body portion 1005 without connecting.

A finalized packaging assembly can be generated by fully assembling the box 1500 into completed form. Various shapes, sizes, and arrangements of box 1500 can be utilized without departing from the scope of the current disclosure.

Figure 8:
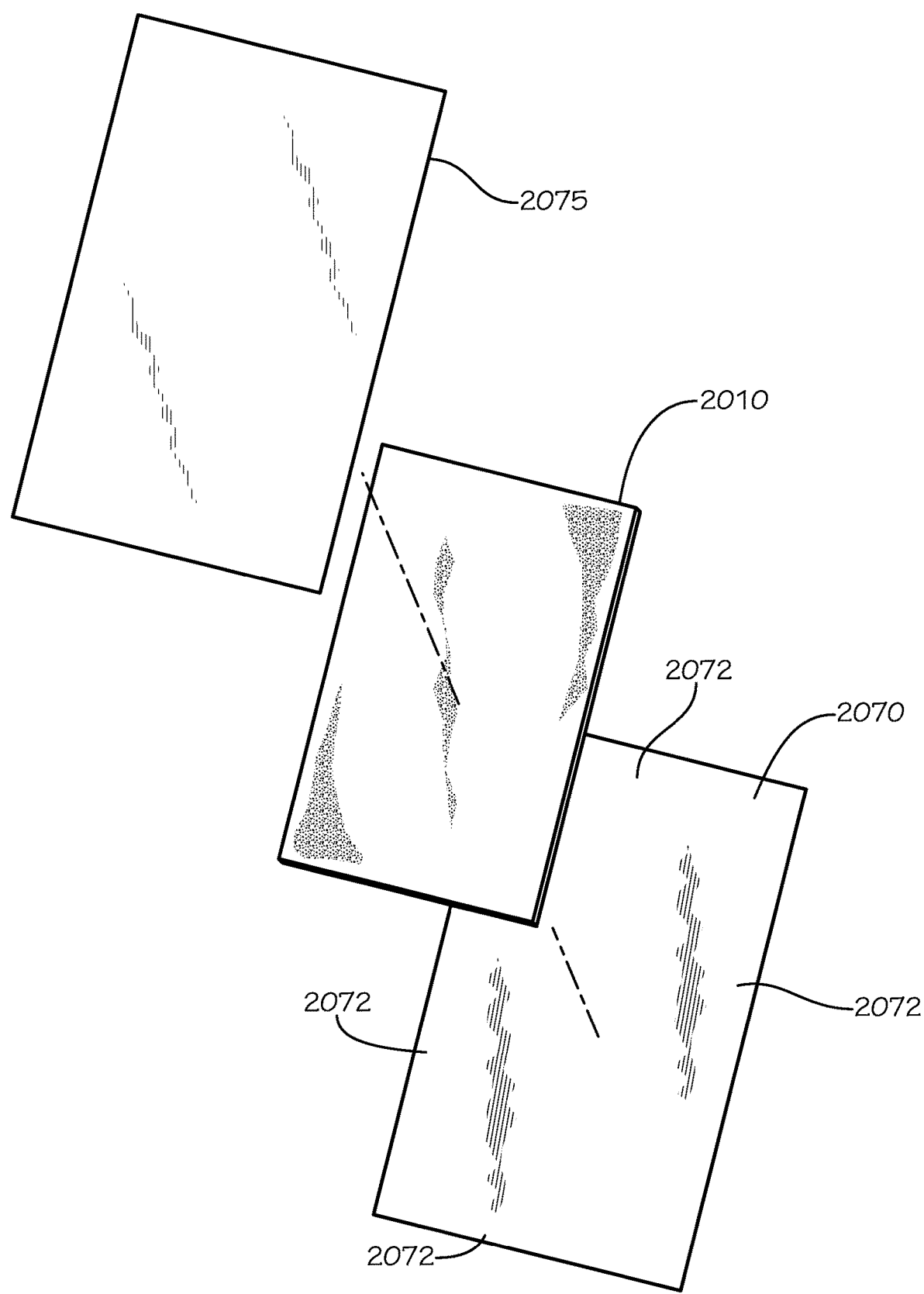
FIG. 8 is an exploded perspective view of a liner panel assembly in accord with one aspect of the current disclosure.

Another aspect can be seen with reference to FIG. 8. As can be seen, an insulative batt 2010 can be captured between an inner panel 2075 and an outer panel 2070. The insulative batt 2010 can be generally flexible in nature and can be capable of being bent or formed in various shapes. In various aspects, loose fill insulation can be utilized in place of the batt 2010. The panels 2070,2075 can be kraft paper or like materials as discussed elsewhere within this disclosure. The batt 2010 can be sized with slightly smaller dimensions than the inner panel 2075 and the outer panel 2070 such that the batt 2010 can be captured between the inner panel 2075 and the outer panel 2070 forming a single-piece panel assembly. The outer panel 2070 can include a perimeter sealing edge 2072 to interface with a perimeter sealing edge (not shown) of the inner panel 2075.

Figure 9:
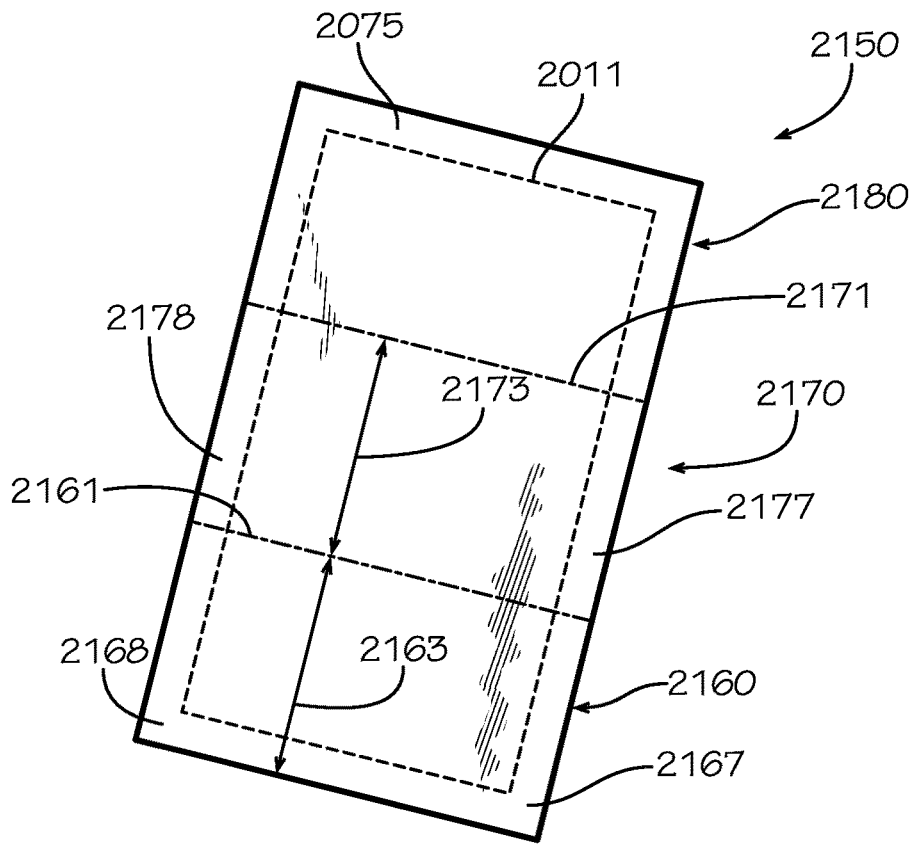
FIG. 9 is a front perspective view of the liner panel assembly of FIG. 8.

A liner panel assembly 2150 can be seen with reference to FIG. 9. The inner panel 2075 can be seen as adhered to the outer panel 2070, which cannot be seen. An outline 2011 of the batt 2010 can be seen for reference of the batt 2010 captured between the outer panel 2070 and the inner panel 2075. The liner panel assembly 2150 can comprise a plurality of sections. Lines are inserted for reference, and in various aspects the lines can be omitted or can be included.

A first panel section 2160 can comprise a lower end of the liner panel assembly 2150. A second panel section 2170 can comprise a central area of the liner panel assembly 2150. And a flap panel section 2180 can comprise a top end of the liner panel assembly 2150. The first panel section 2160 can be separated from the second panel section 2170 by a line 2161 and the second panel section 2170 can be separated from the flap panel section 2180 by a line 2171. In various aspects, the lines 2161,2171 can be reference lines drawn on the inner panel 2075. In various aspects, the lines 2161,2171 can be omitted entirely, and the lines 2161,2171 as drawn in FIG. 9 can be simple reference lines for illustration only. In various aspects, the lines 2161,2171 can represent score lines, bend lines, creases, perforations, or other weakened areas designed to assist in bending the liner panel assembly 2150 as desired.

In the current aspect, the first panel section 2160 can be of a height 2163 that is about the same as a height 2173 of the second panel section 2170. The first panel section 2160 can comprise a first sealing edge 2167 and a second sealing edge 2168. Similarly, the second panel section 2170 can comprise a first sealing edge 2177 and a second sealing edge 2178. The first sealing edges 2167,2177 can be adapted to abut and to seal against one another using various methods described elsewhere in this disclosure. Likewise, the second sealing edges 2168,2178 can be similarly adapted as the first sealing edges 2167,2177.

Figure 10:
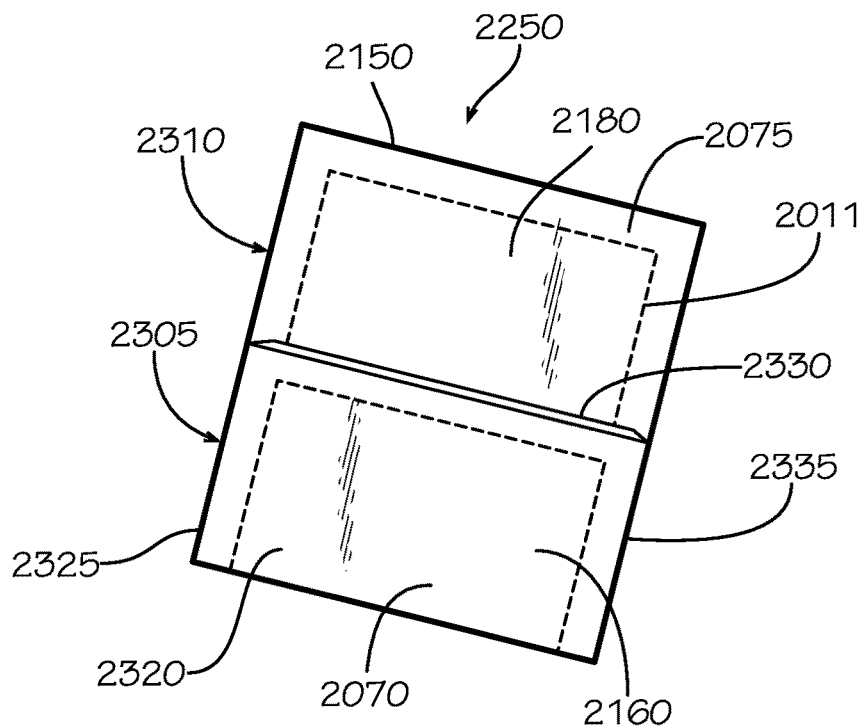
FIG. 10 is a front perspective view of a liner subassembly formed from the liner panel assembly of FIG. 9.

As seen with reference to FIG. 10, a liner subassembly 2250 can be formed from the liner panel assembly 2150 by adhering the first sealing edges 2167,2177 together and the second sealing edges 2168,2178 together. Once arranged as a liner subassembly 2250 similar to liner 1000, various features and arrangements of liner 1000 can be imported. For example, liner subassembly 2250 can comprise a body portion 2305 and a flap portion 2310. The liner subassembly 2250 can comprise a front 2320, sides 2325 and 2335, and a back 2330. Similar features of the liner 1000 not specifically articulated would be understood by one of skill in the art to be included with linear 2250.

Figure 11:
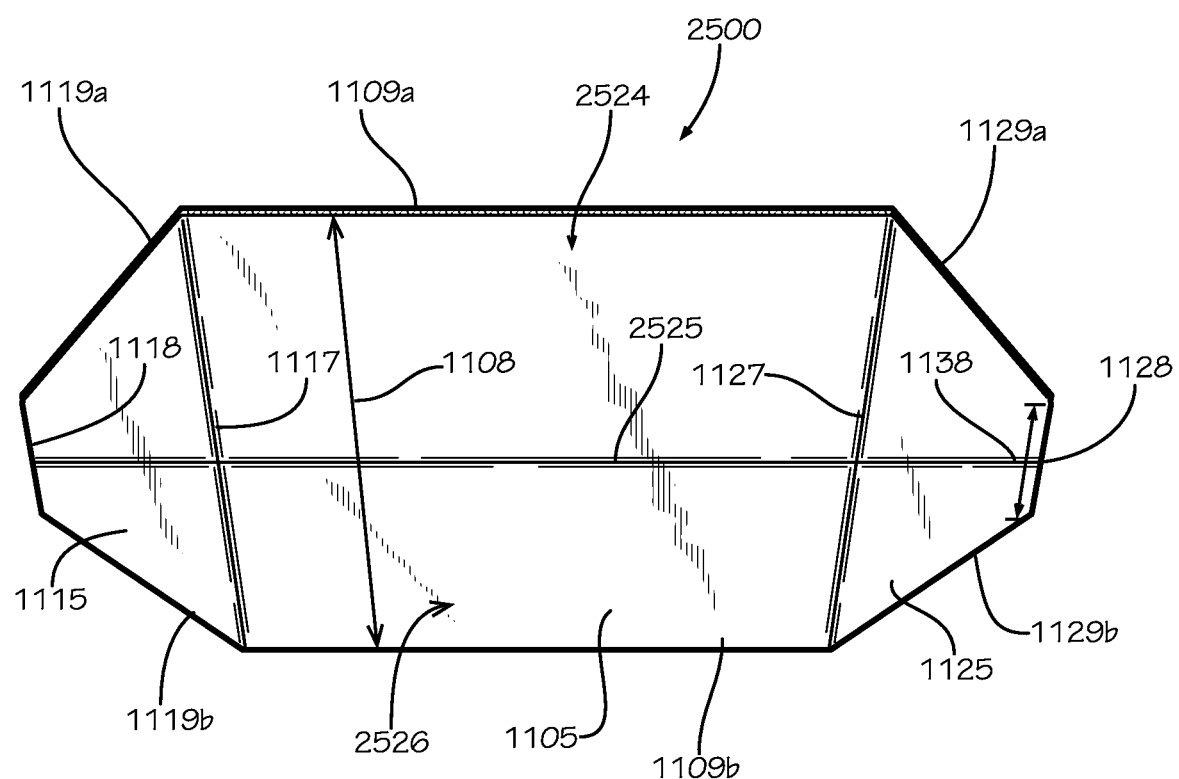
FIG. 11 is a front perspective view of a support in accord with one aspect of the current disclosure.

As seen with reference to FIG. 11, a support 2500 can comprise many substantially similar elements to support 1100. However, support 2500 can comprise a lengthwise bend line 2525 arranged linearly bisecting the support 2500 in a lateral direction. The lengthwise bend line 2525 can be arranged orthogonally to the bend lines 1117,1127. Because of the mechanical shape memory and inherent stiffness of the material, the support 2500 can be bent along lengthwise bend line 2525 or along at least one of bend lines 1117,1127. The lengthwise bend line 2525 can bisect the support 2500 into a first half 2524 and a second half 2526.

Figure 12:
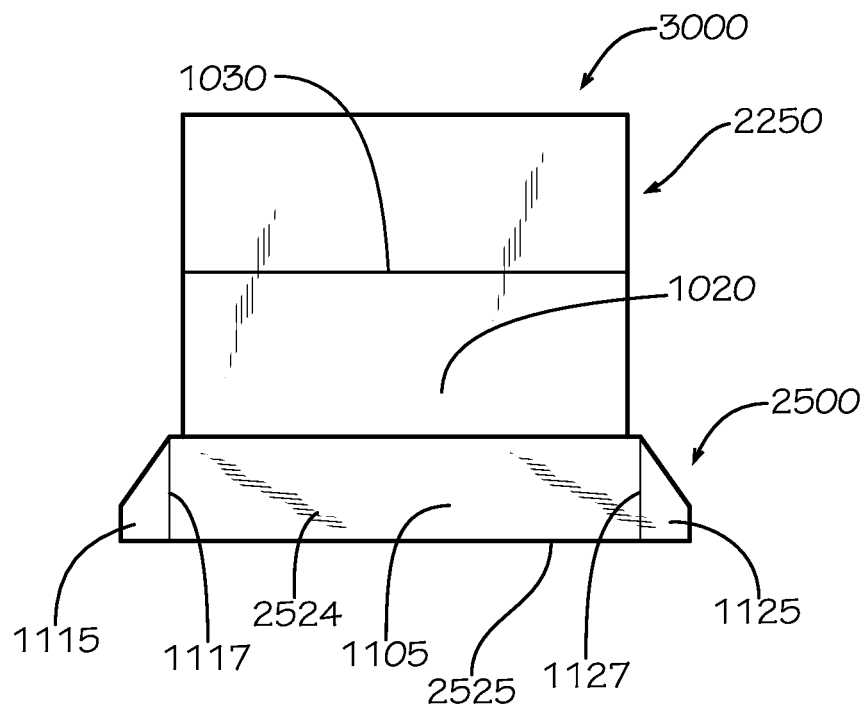
FIG. 12 is a front perspective view of a liner formed from the liner subassembly of FIG. 10 and the support of FIG. 11

As seen with reference to FIG. 12, the liner subassembly 2250 can be arranged connected to or abutting the support 2500 using various connection mechanisms as disclosed elsewhere herein. In various aspects, the support 2500 can be adhered to the linear subassembly 2250 to form a liner 3000. The liner 3000 can be arranged in the laid-flat configuration of FIG. 12 for ease of shipping and storage. The liner 3000 can be shipped to customers or stored on shelves in the flattened arrangement more easily than in an expanded arrangement. The construction of the liner 3000 being of a single piece of insulative batt and of simple materials and assembly can produce very low costs of assembly and construction as compared to similar liner options that are construction of more pieces. The first half 2524 can be adhered to the front 1020 of the liner subassembly 2250 and the second half 2526 can be adhered to the back 1030 of the liner subassembly 2250.

Figure 13:
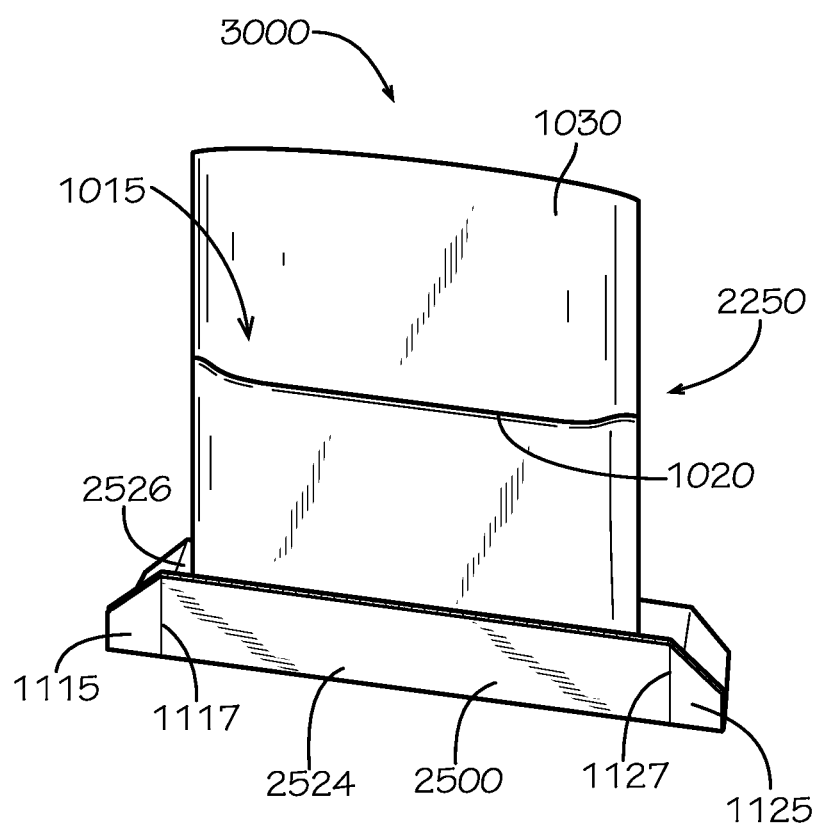
FIG. 13 is a front perspective view of the liner of FIG. 12 in partial arrangement for insertion into a box.

As can be seen with reference to FIG. 13, the support 2500 can begin to be hinged along the bend lines 1117,1127 to begin to open the support 2500 from its flattened position to a support position. When the support 2500 is adhered to the liner subassembly 2250, the front 1020 can follow the first half 2524 of the support 2500 and the back 1030 can follow the second half 2526. As such, the cavity 1015 can begin to be defined between the front 1020 and the back 1030.

Figure 14:
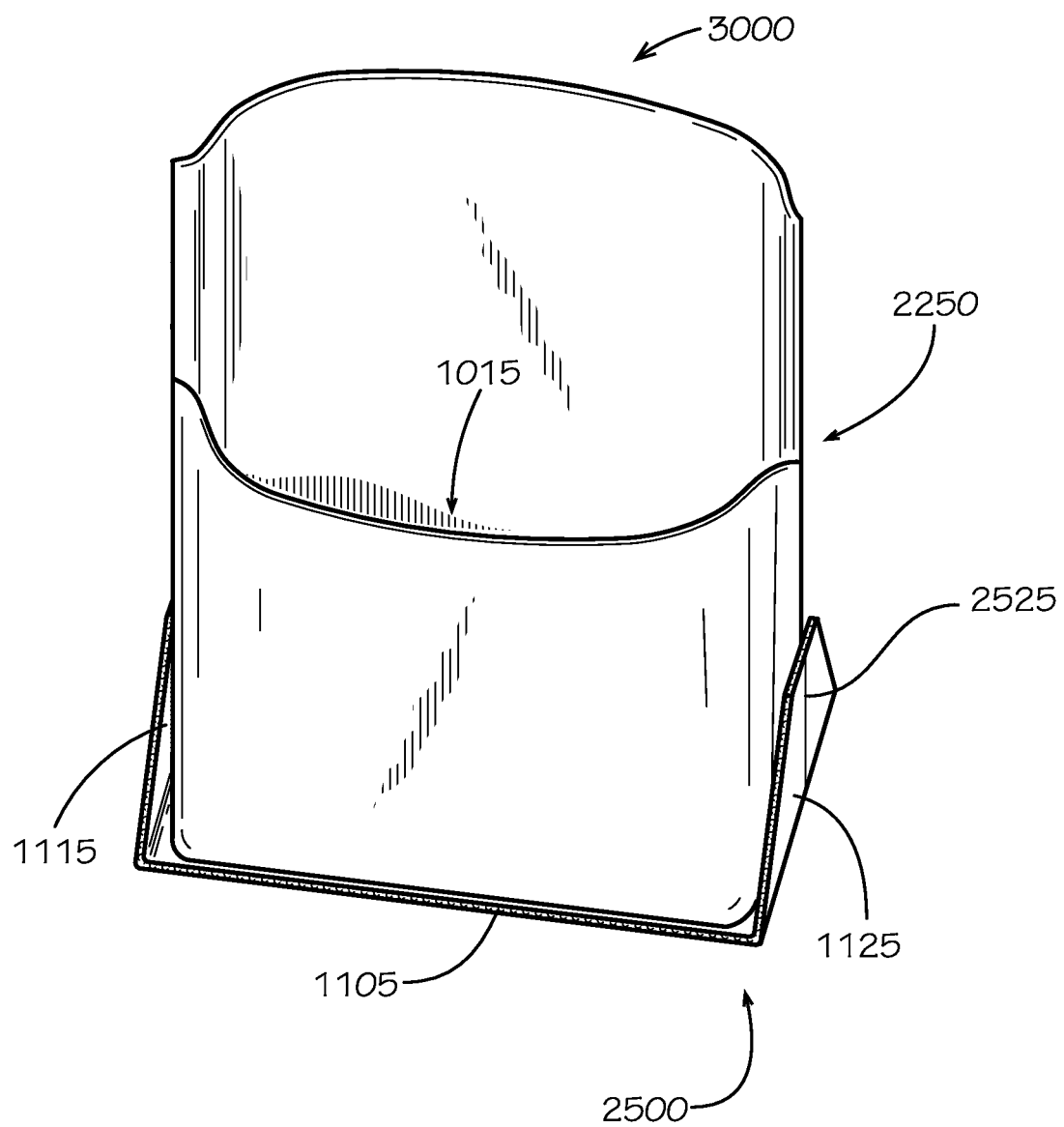
FIG. 14 is a front perspective view of the liner of FIG. 12 in arrangement for insertion into a box.

As seen with reference to FIG. 14, when the end portions 1115,1125 can be aligned about orthogonal to the central body 1105, the first half 2524 and the second half 2526 can be forced to open and lay flat such that the support 2500 can hold the liner subassembly 2250 open, keeping the cavity 1015 defined. In such an arrangement, the support 2500 can include little or no bending along the lengthwise bend line 2525. As such, the stiffness of the support 2500 can help define the shape of the liner 3000.

As seen elsewhere in this disclosure, the liner 3000 can be inserted into a box such as box 1500. When inserted within the box 1500, the end portions 1115, 1125 can be arranged such that the box 1500 can prevent the unbending along bend lines 1117,1127, respectively. As such, bending along lengthwise bend line 2525 can be prevented, and the liner 3000 can be maintained in an opened relationship, allowing for ease of use in packaging items within the box 1500 and liner 3000.

It would be noted by one of ordinary skill in the art that, although the end portions 1115,1125 of the current disclosure are seen bent upwards, it would be equally possible to bend these end portions 1115,1125 downward to achieve a similar result of preventing bending along lengthwise bend line 2525. Additionally, there may be advantages of bending downward that are not specifically discussed herein.

It would be understood by one of skill in the art that various aspects and features can be utilized within various other aspects and features of the disclosure, and one should not consider the disclosure limited by the scope of one particularly disclosed element.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A liner comprising:
    a liner subassembly, the liner subassembly comprising
        a body portion, the body portion comprising a front, a back, a first side, a second side, and a bottom, the body portion defining a cavity; and
        a flap portion hingedly connected to a top end of the back, the flap portion sized to cover the cavity; and
    a support connected to the bottom external to the cavity, the support comprising a central body and two end portions, each end portion hingedly connected to the central body by an end portion bend line, the support providing structure to the sides such that the cavity is defined between the front and the back, the support also defining a lengthwise bend line that is orthogonal to each end portion bend line, the lengthwise bend line defining a first half and a second half of the support, the support reconfigurable between a flattened position and a support position, the first half folded relative to the second half about the lengthwise bend line in the flattened position, the central body being substantially planar in the support position, the two end portions configured to hinge open the support from the flattened position to the support position when the two end portions are folded to be about orthogonal to the central body,
    wherein the body portion and the flap portion comprise an insulation material captured between two walls,
    wherein adjusting the central body alters the shape and sizing of the cavity.

2. The liner of claim 1, wherein the liner subassembly comprises at least four panels, each panel mechanically connected to at least one other panel.

3. The liner of claim 2, wherein the liner subassembly comprises a front half and a rear half, wherein each half further comprises two sheets of kraft paper adhesively capturing an insulative batt.

4. The liner of claim 3, wherein the front half is connected to the rear half at a seam along the body portion.

5. The liner of claim 3, wherein the liner subassembly further comprises at least one pleat defined proximate the bottom and at least one of the first and second sides.

6. The liner of claim 1, wherein the first half is connected to the front and the second half is connected to the back.

7. The liner of claim 1, wherein the support is corrugated cardboard.

8. A packaging assembly comprising:
   a box, the box comprising a front, a back, a first side, a second side, and a bottom;
   a liner, the liner comprising
      a liner subassembly, the liner subassembly comprising
         a liner panel assembly, the liner panel assembly comprising an insulative batt, the insulative batt being bendable; and
         at least two panels connected together and enclosing the insulative batt;
      the liner panel assembly defining a first panel section adjacent to a second panel section and a flap panel section adjacent to the second panel section, wherein each of the first panel section and the second panel section defines a first sealing edge and a second sealing edge, wherein the first sealing edge of the first panel section is connected to the first sealing edge of the second panel section and wherein the second sealing edge of the first panel section is connected to the second sealing edge of the second panel section; and
      a support connected to the first panel and the second panel at an end of the liner subassembly distal to the flap panel section, the support comprising a central body and two end portions, each end portion hingedly connected to the central body along an end portion bend line, the support comprising a lengthwise bend line, the lengthwise bend line defining a first half and a second half of the support, wherein the first half is connected to the first panel section and the second half is connected to the second panel section, the support reconfigurable between a flattened position and a support position, the first half folded relative to the second half about the lengthwise bend line in the flattened position, the central body being substantially planar in the support position, the two end portions configured to hinge open the support from the flattened position to the support position when the two end portions are folded to be about orthogonal to the central body,
   wherein the lengthwise bend line is orthogonal to each end portion bend line,
   wherein the liner defines a body portion positioned in the box, the body portion comprising a front, a back, a first side, a second side, and a bottom, the body portion defining a cavity,
   wherein the support is positioned external to the cavity,
   wherein the flap panel section defines a flap portion hingedly connected to a top end of the back of the body portion, the flap portion sized to cover the cavity; and
   wherein the cavity is defined by separation of the first half and the second half of the support by bending the support along the lengthwise bend line to place the support in the support position.

9. The packaging assembly of claim 8, wherein the liner subassembly comprises at most two panels.

10. The packaging assembly of claim 8, wherein the insulative batt is one piece.

11. The packaging assembly of claim 8, wherein the insulative batt comprises a bend line between the first panel section and the second panel section.

12. The packaging assembly of claim 8, wherein the liner subassembly further comprises at least one pleat defined proximate the bottom of the body portion and at least one of the first and second sides of the body portion.

13. The packaging assembly of claim 12, wherein each pleat exerts spring force on at least one end portion, and wherein at least one end portion contacts the box.

14. The packaging assembly of claim 13, wherein the central body contacts the bottom of the box.

15. The packaging assembly of claim 14, wherein an inner surface of the flap portion contacts an upper end of the body portion, thereby enclosing the cavity.

16. The packaging assembly of claim 15, wherein each end portion is tapered.

17. The packaging assembly of claim 16, wherein the support is corrugated cardboard.

18. The packaging assembly of claim 17, wherein the insulative batt comprises a material that is paper.

19. A method of assembling a packaging assembly comprising the steps of:
   obtaining a box, the box comprising a front, a back, a first side, a second side, and a bottom;
   obtaining a liner, the liner comprising a liner subassembly and a support,
      the liner subassembly comprising
         an insulative batt, the insulative batt being bendable; and
         at least two panels connected together and enclosing the insulative batt;
      the liner panel assembly defining a first panel section adjacent to a second panel section and a flap panel section adjacent to the second panel section, wherein each of the first panel section and the second panel section defines a first sealing edge and a second sealing edge, wherein the first sealing edge of the first panel section is connected to the first sealing edge of the second panel section and wherein the second sealing edge of the first panel section is connected to the second sealing edge of the second panel section; and
      the support comprising a central body and two end portions, each end portion hingedly connected to the central body along an end portion bend line, the support comprising a lengthwise bend line arranged orthogonally to the end portion bend lines and defining a first half and a second half of the support, wherein the first half of the support is connected to the first panel section and the second half of the support is connected to the second panel section;
   wherein the liner is arranged in a laid-flat configuration such that the first panel section is in contact with the second panel section, such that the support is hinged along the lengthwise bend line, and such that the central body is arranged in a folded position;
   inserting the liner within the box, wherein inserting the liner within the box comprises bending each end portion hingedly with respect to the central body, whereby the first half of the support is hinged with respect to the second half of the support by bending of the end portions;

expanding the liner by arranging the central body in an unfolded position by expanding the support, wherein the expansion of the support is accomplished by bending the support along the lengthwise bend line and thereby defining a cavity formed between the first panel section and the second panel section;

arranging each end portion in orthogonal arrangement to the central body by bending each end portion along each end portion bend line; and folding the flap portion relative to the body portion to enclose the cavity.

\* \* \* \* \*